J. H. McCORMICK.
CASH REGISTER.
APPLICATION FILED MAR. 26, 1901.
1,071,768.
Patented Sept. 2, 1913.
11 SHEETS—SHEET 9.
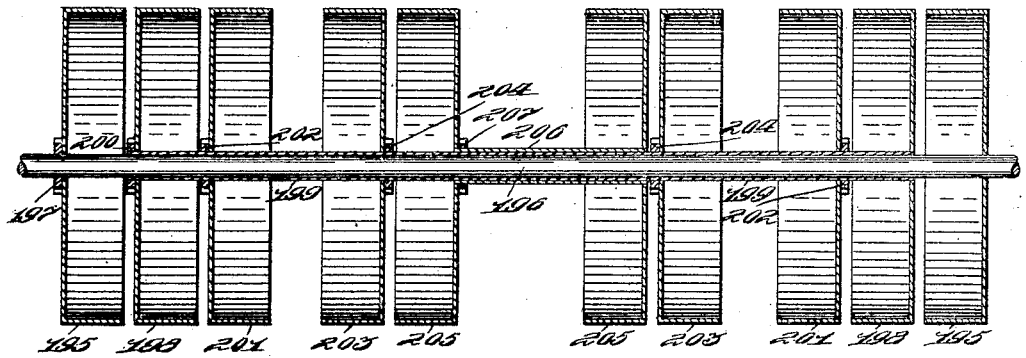
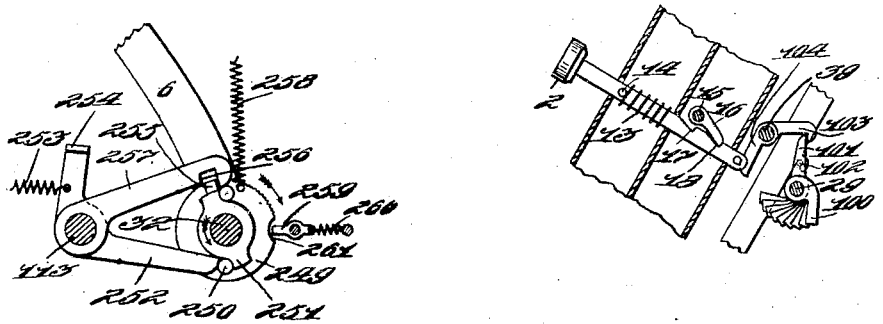
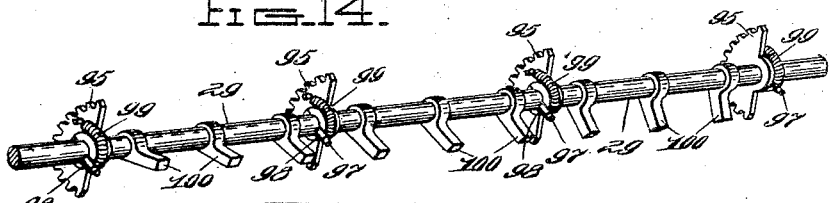
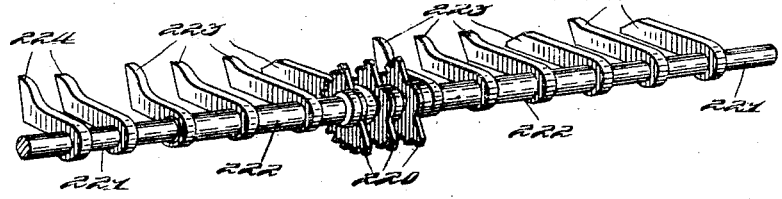

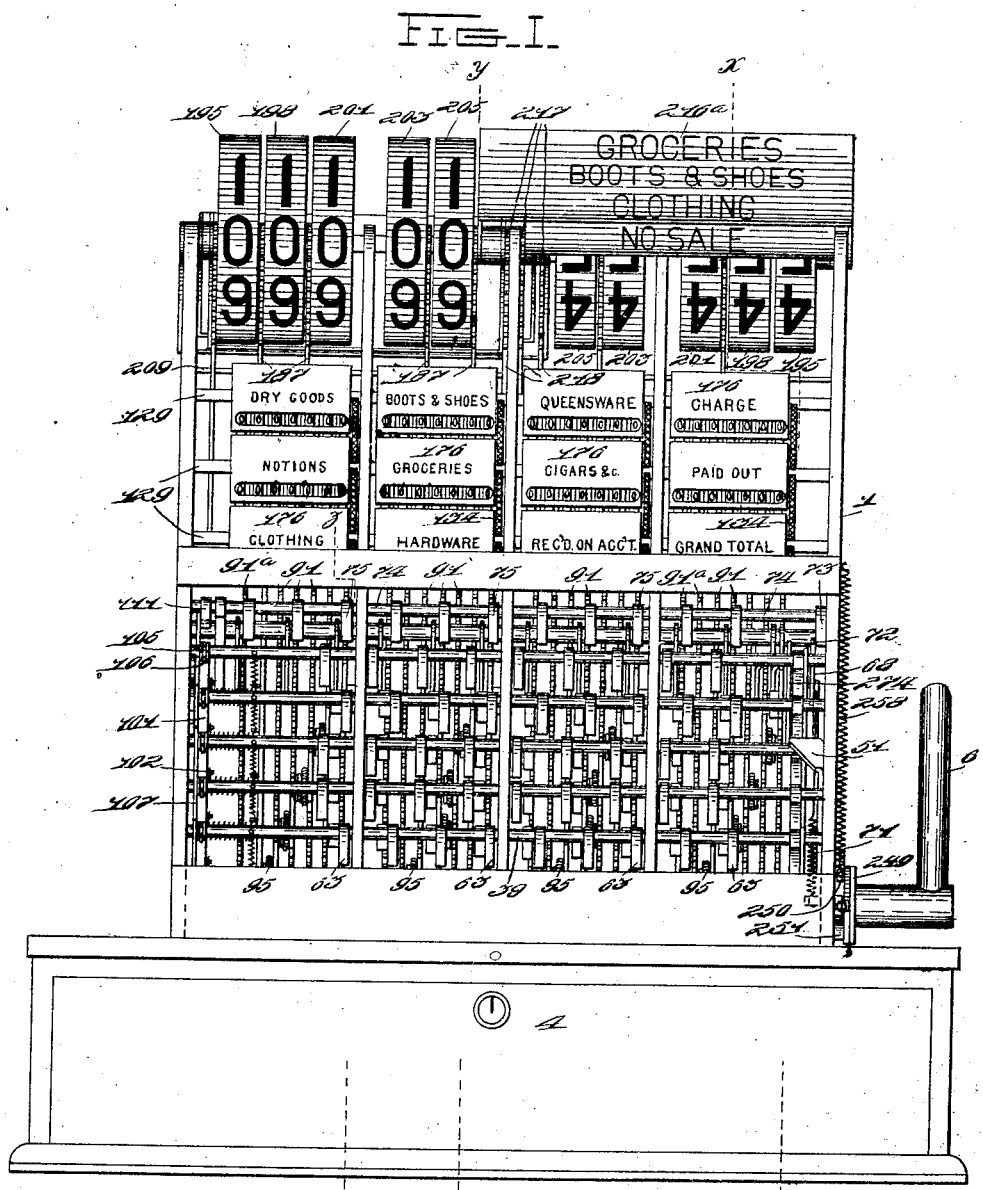

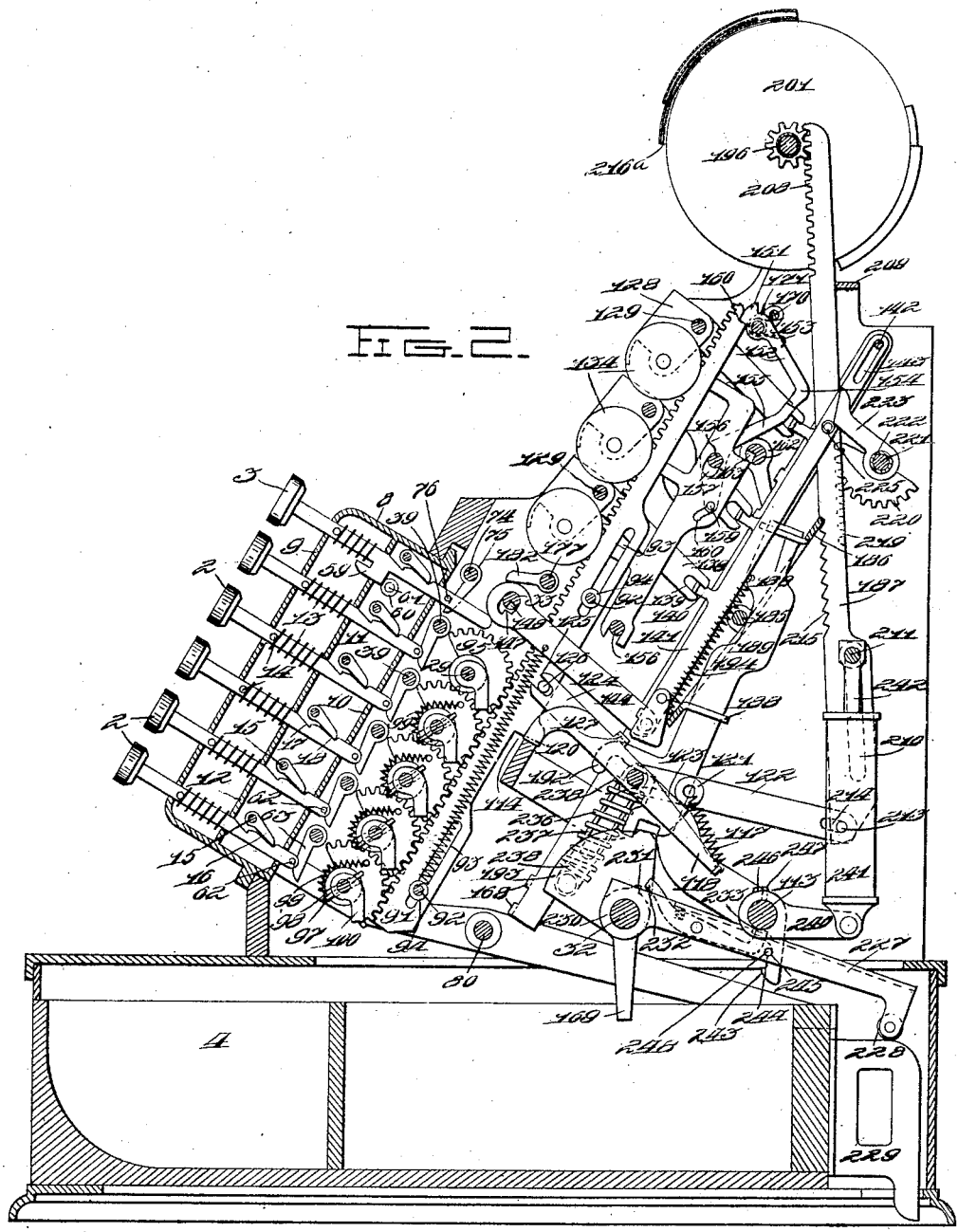

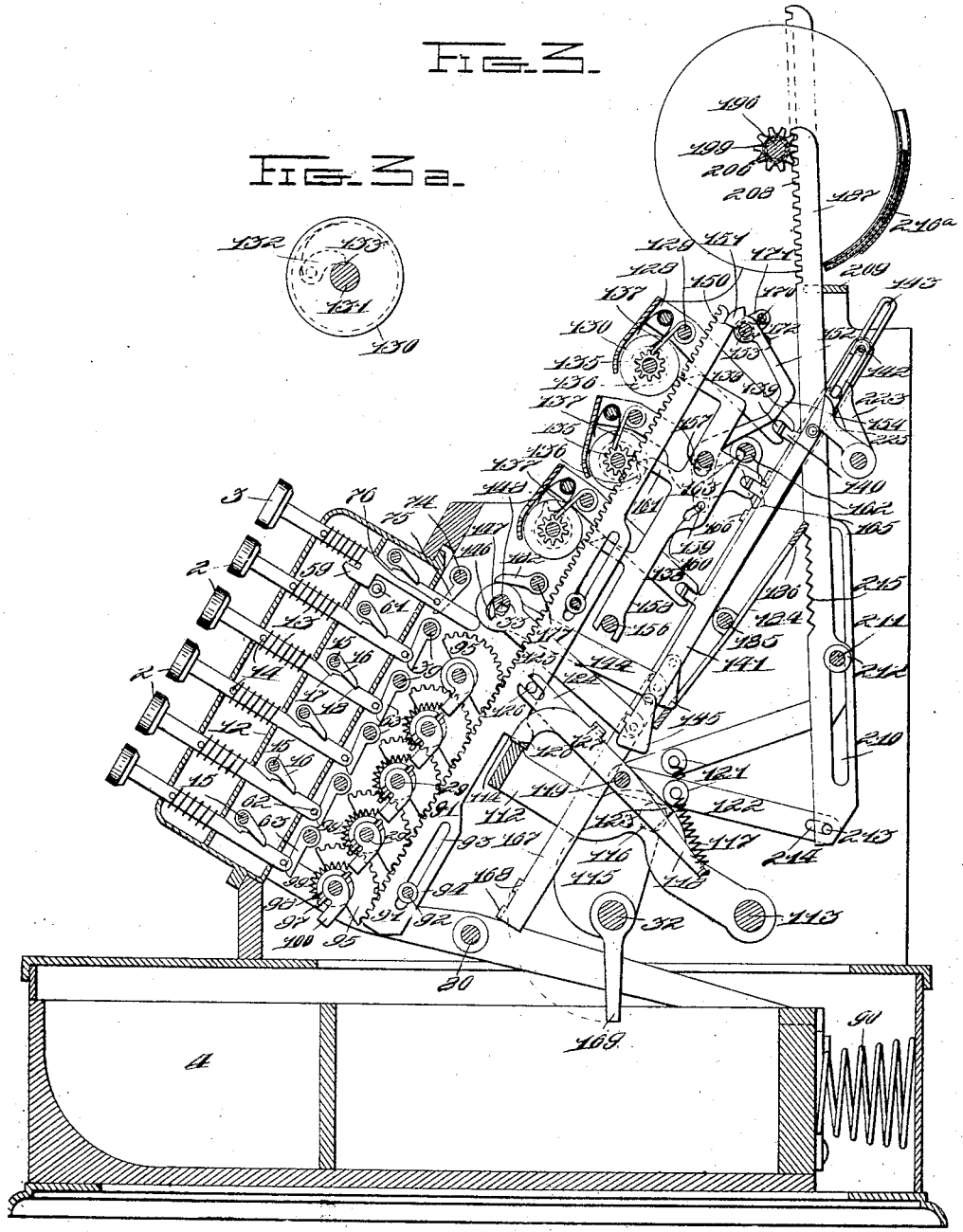

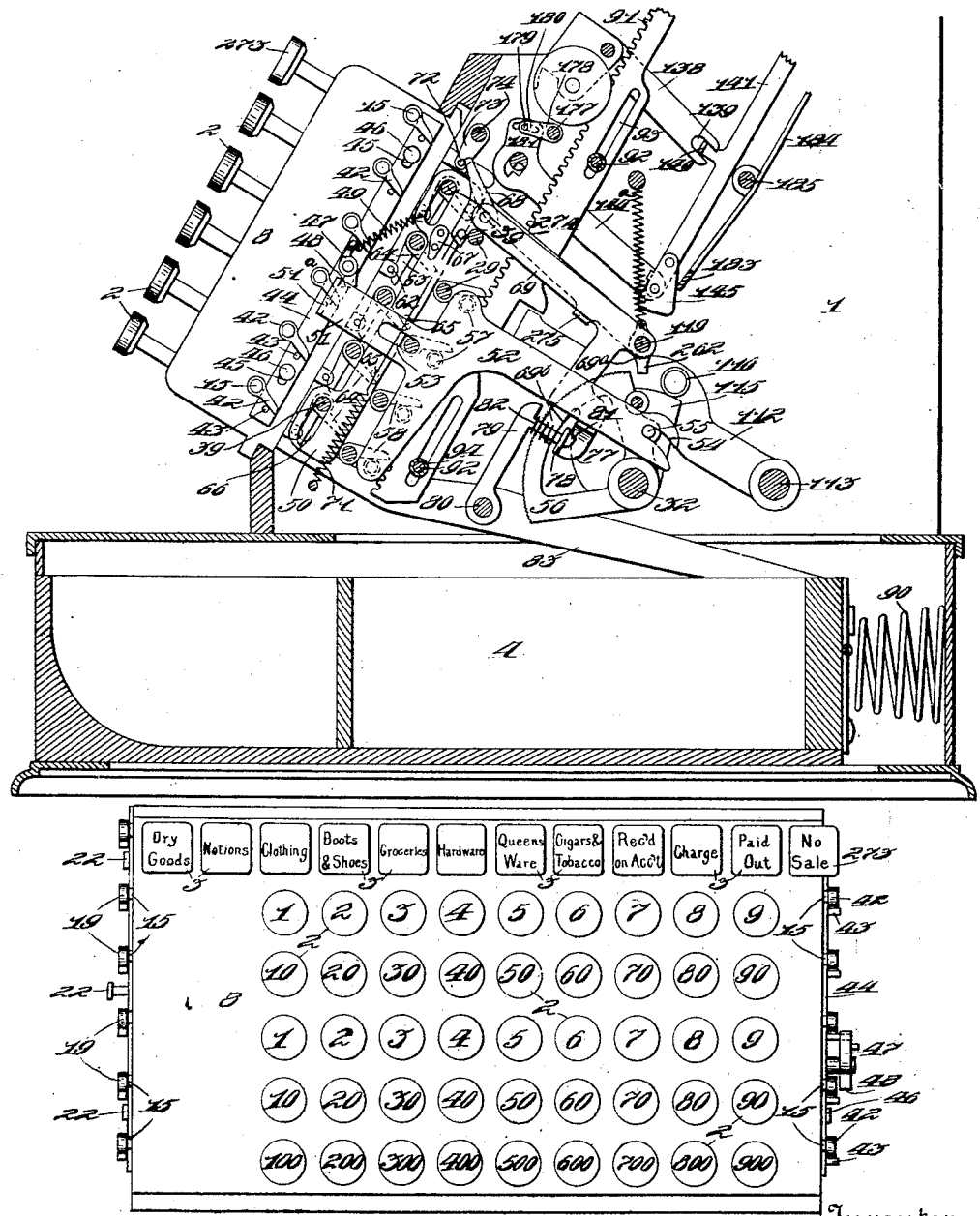

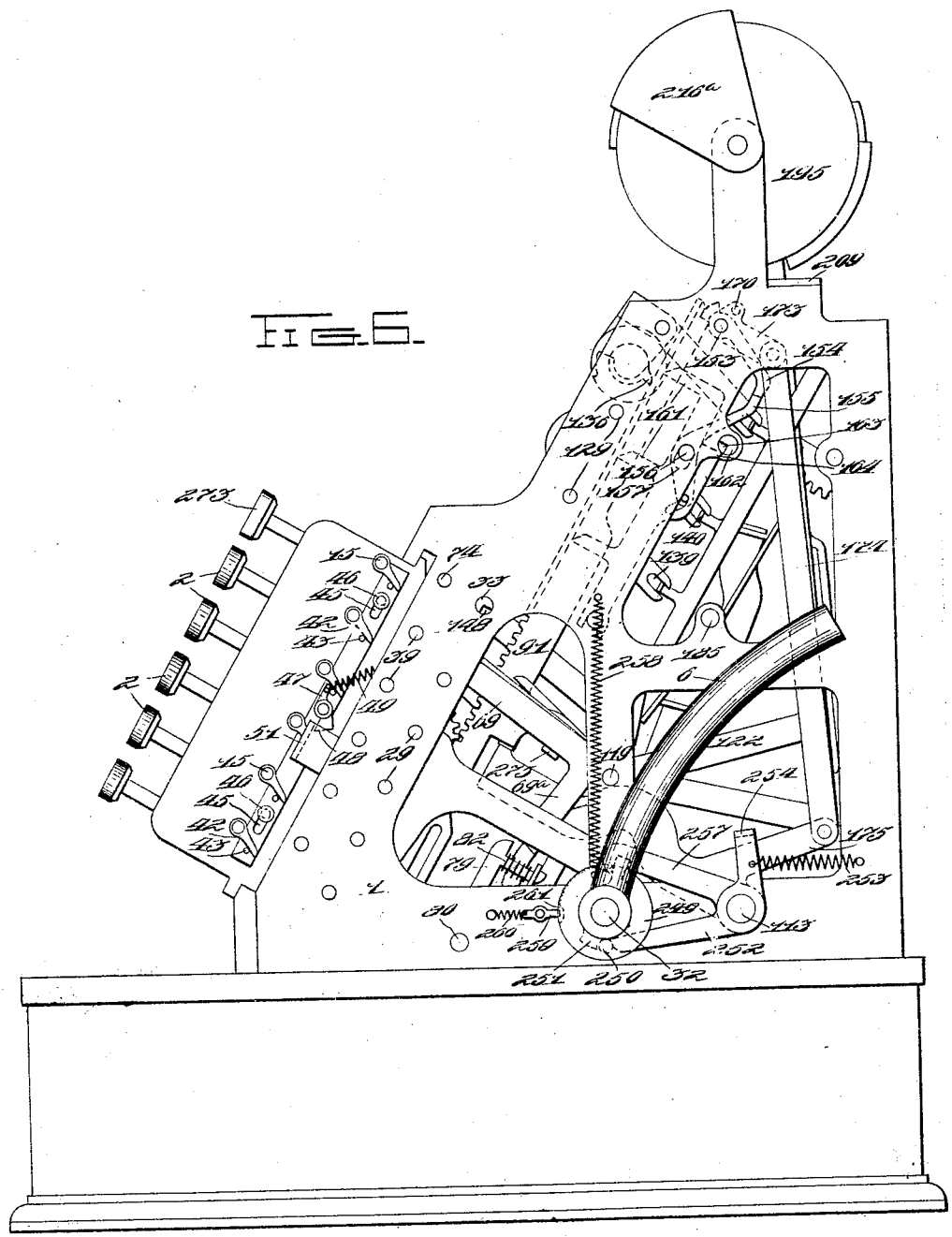

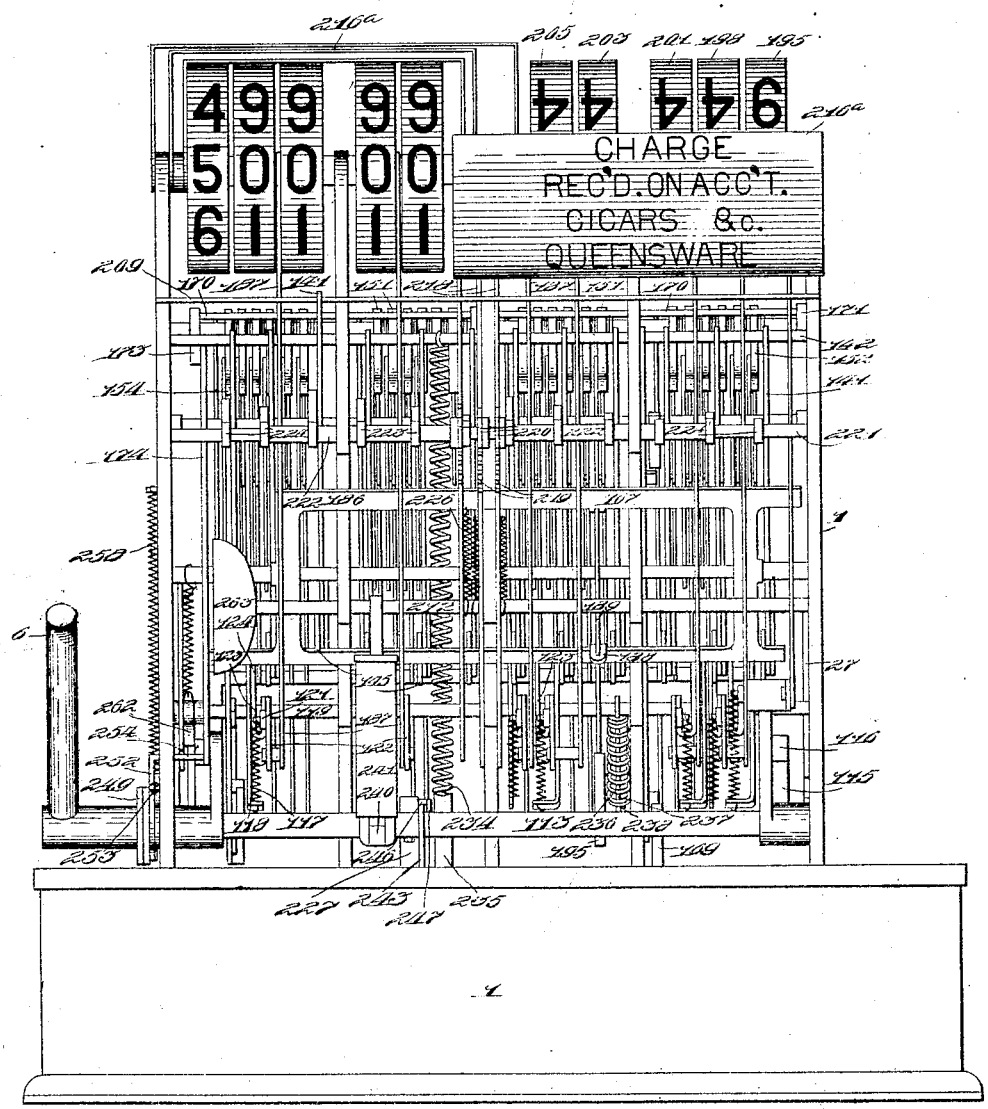

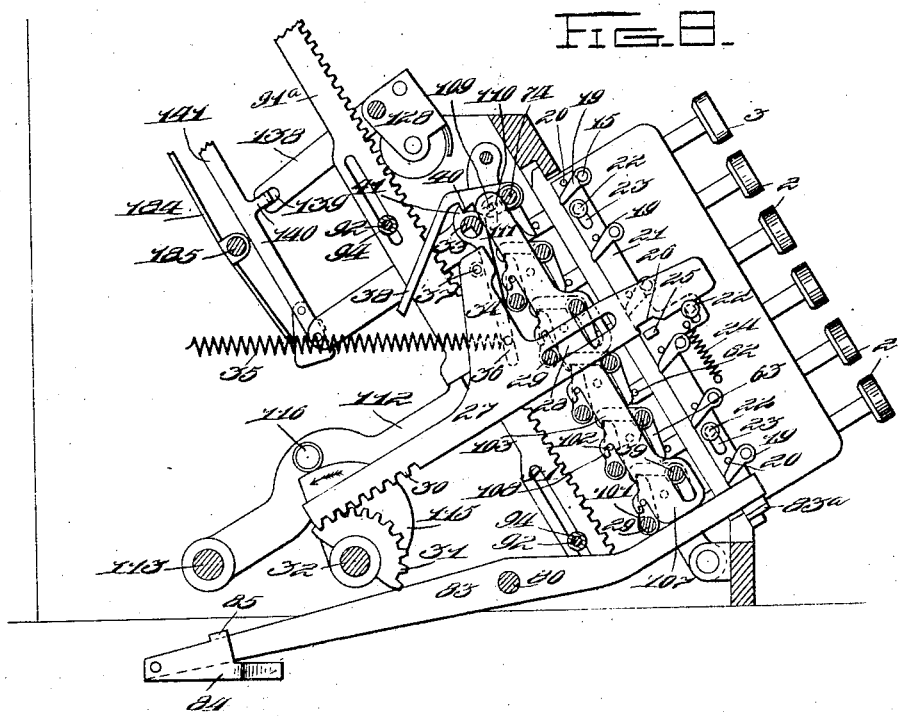

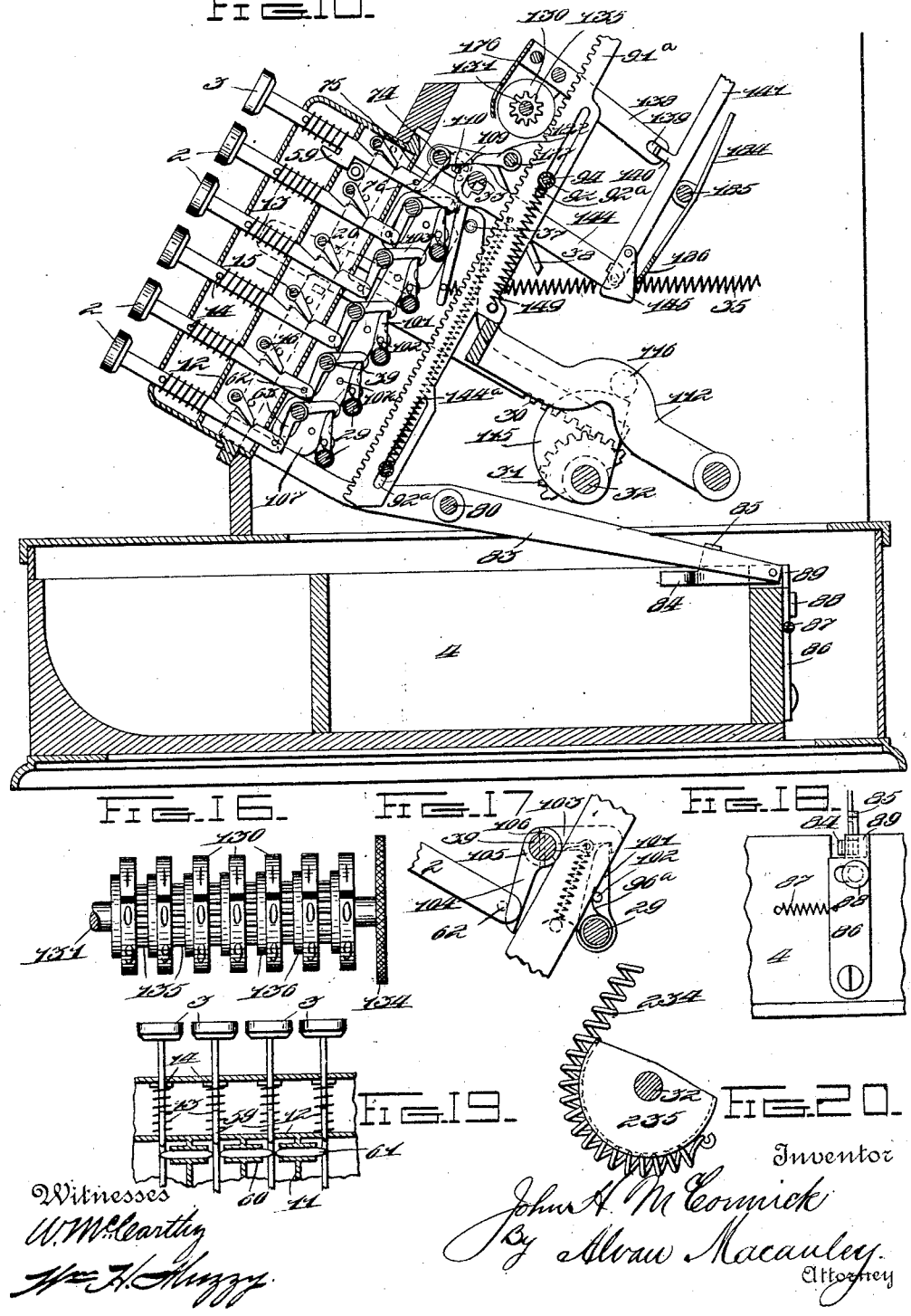

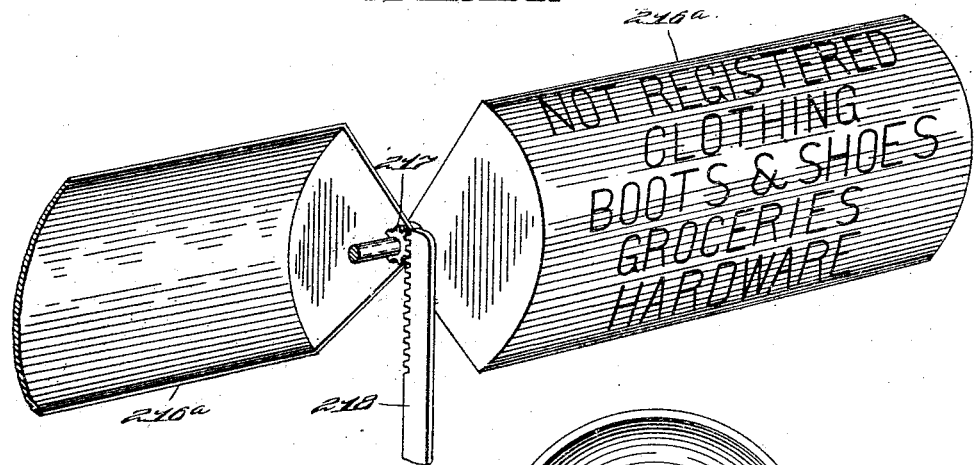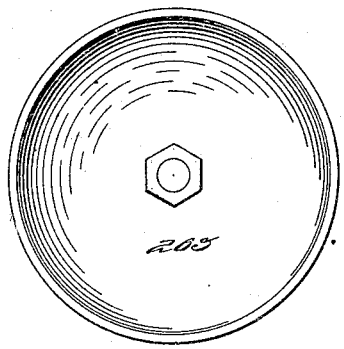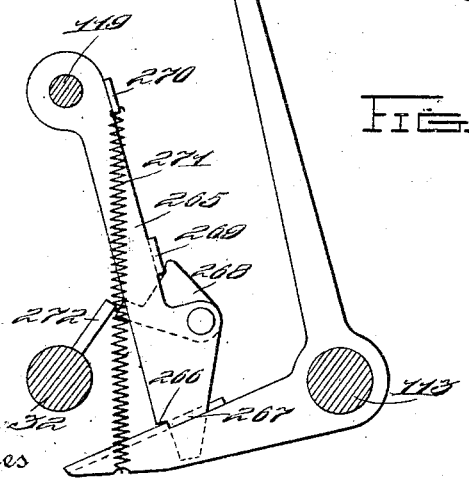

J. H. McCORMICK.
CASH REGISTER.
APPLICATION FILED MAR. 26, 1901.

1,071,768.

Patented Sept. 2, 1913.
11 SHEETS—SHEET 11.

FIG. 23.

FIG. 24.

Witnesses
W. McCarthy

Inventor
John H. McCormick
By Alvan Macauley
Attorney

UNITED STATES PATENT OFFICE.

JOHN H. McCORMICK, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,071,768.　　　　　Specification of Letters Patent.　　Patented Sept. 2, 1913.

Application filed March 26, 1901. Serial No. 52,915.

*To all whom it may concern:*

Be it known that I, JOHN H. McCORMICK, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers.

Among the objects of the invention may be stated to be the provision of an improved multiple counter register having a plurality of counters or totalizers any of which may be connected to common operating means and with positively acting devices for causing such connection.

Another object is to provide locking means whereby the operation of the actuating devices is prevented until some one of the totalizers is arranged for connection with the said actuating devices.

A further object is to provide a drawer releasing device of improved construction with mechanism preventing a release of the drawer while any amount key is partly depressed.

A further improvement consists in the provision of a main operating mechanism whereby the machine may be operated either from a crank handle or the like or from the movable cash receptacle with provisions whereby the receptacle may be permitted to remain either open or closed while the machine is actuated from the crank handle.

With these and incidental objects in view, the invention consists in certain novel features of construction and combination of parts the essential elements of which are set forth in appended claims and a preferred form of embodiment of which is hereinafter described with reference to the drawings which accompany and form part of this specification.

In the accompanying drawings forming part of this specification, Figure 1 represents a front elevation of a machine embodying my invention with the inclosing cabinet removed. Fig. 2, represents a vertical transverse section through the same on the line $x$—$x$ of Fig. 1. Fig. 3 represents a view similar to Fig. 2 on the line $y$—$y$ of Fig. 1. Fig. 3ª represents a detail side elevation of one of the counter wheels showing the pawl for connecting the same to the shaft when it is desired to turn the wheel to zero. Fig. 4 represents a broken end elevation partly in section taken from the right hand side of the machine. Fig. 5 represents a detail top plan view of the removable key board. Fig. 6, represents an end elevation taken from the right hand side of the machine. Fig. 7 represents a rear elevation of my said improved machine. Fig. 8 represents a broken elevation partly in section of parts of my machine looking from the left. Fig. 9 represents an enlarged perspective view of the rocking frame and coöperating parts for locking the indicator slides and the counter throwing levers. Fig. 10 represents a broken vertical section on the line $z$—$z$ of Fig. 1, the indicators and a number of other parts being omitted. Fig. 11 represents an enlarged detail vertical longitudinal section through the amount indicators. Fig. 12 represents an enlarged detail side elevation of the clutch mechanism between the main rock shaft and the operating handle. Fig. 13 represents a detail side elevation of a portion of the key board and one of the shafts carrying the progressively arranged stop arms. Fig. 14 represents an enlarged detail perspective view of one of the shafts carrying the progressively arranged stop arms. Fig. 15 represents an enlarged detail perspective view of the shaft and sleeves supporting the series of cam arms for operating the respective special indicators. Fig. 16 is a view in elevation of one of the counters detached from the machine. Fig. 17 is a detail elevation view showing the inner end of one of the value keys and the coöperating parts which are arranged to lock the operating rock shaft at a predetermined time. Fig. 18 shows a portion of the cash drawer and the drawer latch. Fig. 19 shows some of the department keys with the slides for preventing the simultaneous operation of two or more of the keys. Fig. 20 shows the main operating shaft with a half-disk thereon, which has a grooved periphery to receive the operating spring. Fig. 21 is a view of one of the special or department indicators. Fig. 22 shows the bell and the operating mechanism therefor. Fig. 23 is a perspective view showing a shaft with various parts of the operating mechanism thereon. Fig. 24 is a view showing one of the special indicator-operating racks and its coöperating parts.

In the drawings, 1 represents the frame and various fixed parts of the machine, 2 the amount or value keys, 3 the special or department keys, 4 the cash drawer, and 6 the operating handle. In general terms the form of the invention which is shown in the drawings may be said to comprise a single key board of amount and department keys, register operating mechanism coöperating with said keys, a series of independent counters arranged to be brought into connection with the operating mechanism at will, amount indicators, special indicators, means for moving the operating mechanism by the cash drawer, and a lever handle for operating the mechanism independently of the cash drawer when so desired. The amount or value keys 2, as shown in Fig. 5 of the drawings, are mounted in five horizontal rows or banks of 9 keys each and each row is numbered in the usual manner, from 1 to 9 or 10 to 90 as the case may be. The special or department keys which are twelve in number are mounted in a horizontal row or bank above the amount keys. The heads of the amount keys upon which the designating numerals are secured or otherwise fixed are preferably round as shown, but the heads of the special or department keys are square whereby they may be readily distinguished from the amount keys in operating the machine. The counters as will be seen by reference to Fig. 1 are twelve in number and are arranged in four vertical rows of three counters each. All of these counters except the lower one in the extreme right hand tier may be said to be independent of each other. The excepted counter, which registers the grand total of nine of the other counters, is arranged to be operated simultaneously with any of the other counters except the "paid out" and "charge" counters which happen to be located directly above it in the same tier. The amount indicators, Figs. 1 and 11, are arranged above the counters in duplicate, oppositely-facing sets adapted to indicate at the back and front of the machine respectively the amount and character of the last recorded transaction. With this brief description of the several elements going to make up the complete machine a detail description of the several mechanisms and considering these in the order in which they naturally present themselves to the operator, the key board will be first described and its several connections.

*The key board.*—The key board or frame 6 (Fig. 2), in which all the keys are movably mounted in the order above enumerated comprises two parallel spaced and connected apertured plates 9 and 10 and spaced dividing webs 11 (Fig. 19) extending from plate 10 about half of the distance toward plate 9 and provided with notched flanges 12 through which the key-shanks extend. The latter are preferably square in cross-section and besides passing through the notched flanges 12 also pass through guiding apertures, formed in plates 9 and 10; each of said keys being normally held in its outer position by a coil spring 13 which surrounds its shank and bears against the respective flange 12 and a pin 14 mounted in said shank. Each horizontal bank of keys including the special bank, is provided with a detent rock-shaft 15 suitably journaled in the key board and having a series of rigid latch fingers or pawls 16 which are arranged to engage notches 17 and 18 formed in the respective key shanks. Each rod 15 is provided at its left hand end as shown in Fig. 8 with an arm 19. These six arms are engaged by pins 20 mounted upon a slide 21 which is movably secured by a suitable slot-and-pin connection 22 and 23 on the left hand end of the key-board frame. The slide 21 is normally drawn downward by a coil spring 24 which connects it to the key-board frame so that pins 20 normally tend to force the arms 19 downward and hold all of the pawls 16 in contact with their respective key shanks. From this structure it results that when the keys are in their normal positions shown in Fig. 2 all of the pawls lie in the notches 18. Now, should one of the keys be depressed its respective pawl will be forced out of its notch 18 by the inclined wall of the same, and the shaft 15 carrying said pawl will thus be rocked against a spring tension whereby when the pawl reaches the notch 17 upon a full depression of the key it will immediately snap into the same and thus latch the key in its depressed position. It will further be seen from the above that when any one of the keys is depressed the slide 21 is first elevated and then as the key is finally depressed, is allowed to resume its normal position shown in Fig. 8. This peculiar movement of the slide is utilized to lock the operating mechanism against movement while a key is being depressed. To effect these results the slide is provided with a lug 25 which when the slide is raised, passes into the notch 26 formed in an inclined locking slide 27, to lock the latter against movement while the lug remains in this notch, that is, while any key is being operated. The locking slide is formed with a slot 28 through which one of a series of rock shafts 29 passes to form a guide for said slide. The front end of said slide rests upon one of the pins 22 forming the slot-and-pin connection between the slide 21 and the key-board frame. The lower end of the locking slide is formed with rack teeth 30 which mesh with a segmental gear 31 fast to the main operating rock-shaft 32.

As before explained, when any key is pressed, its transverse detent-shaft 15 is thereby rocked, which, through its arm 19 and pin 20, raises the slide 21 and brings the lug 25 thereon into the notch 26 of the locking-slide 27. If, on the other hand, the locking-slide be first moved inward, the notch will be moved out of alinement with the lug, which will instead be adjacent the solid edge of the locking slide and therefore whenever the latter is displaced the slide 21 cannot be moved, and consequently no key can be operated. At each operation of the machine as hereinafter described, the main operating rock-shaft 32 is swung in the direction of the arrow (Fig. 8) and the locking-slide is thereby moved inward, from which it results that no key can be pressed after the operation of the machine has commenced. The locking slide is arranged also to lock the counter-throwing shaft 33, hereinafter described, so as to prevent any counter being thrown into engagement with the operating mechanism except at the proper time. This is accomplished by means of an upward extension or arm 34 formed on the locking slide and carrying a lateral, inwardly-projecting pin 37, which normally contacts with the downwardly-extending arm 36 fast upon the shaft 33. The said arm is connected to a coiled spring 35 which normally tends to draw it rearward. So long as the locking-slide is in normal position, however, the pin 37 locks the arm 36 in the position shown in Fig. 8 and thereby prevents any movement of the counter-throwing shaft 33, and consequently prevents any of the counters from being thrown into engagement until the proper time. Indeed, the arm 36 is not unlocked immediately upon the beginning of movement of the locking-slide because it is still held in normal position by the latch 38 which is pivoted upon one of the series of rock-shafts 39 and has a locking nose 40 which engages the corresponding nose 41 on the arm 36. When the locking-slide nears the end of its inward movement, the pin 37 strikes the depending end of the latch 38 and rocks it so as to withdraw the nose 40 from engagement with the nose 41, and thereby the counter-throwing shaft 33 is unlocked. The counters, therefore, cannot be thrown into engagement with the registering racks hereinafter described until the locking-slide has almost completed its inner or rearward movement. In this manner the counter-operating racks, as will be presently described, are given ample time to assume their differential positions before the counters can be thrown into engagement. When the slide 27 is returned to its forward position the pin 37 again engages the arm 36 and forces the same forward against the tension of the counter-throwing spring 35 until the latch 38 again engages the shoulder 40 and holds the shaft 33 in its set position shown in Fig. 8.

When a key has been depressed and locked in its operated position, it is necessary after the registration has been made, that said key be automatically released, and to accomplish this result at the proper time I provide each of the shafts 15 at its right hand end with a rigid arm 42. (Fig. 4). Each of these arms is adapted to be struck and operated by a pin 43; said pin being rigidly mounted upon a slide bar 44 which is mounted upon the key-board frame by a suitable slot-and-pin connection 45 and 46. The slide 44 carries a pivoted pawl 47 having a cam face 48 and held in its normal position by a coil spring 49 connected thereto and to a slide bar 50 hereinafter described. The cam face of this pawl is so located as to be engaged by flange 51$^a$ formed on the forward extension 51 of the transfer operating slide 52. The latter is formed with a slot 53 through which passes one of the rock-shafts 29; the lower end of said slide being formed with a curved slot 54 into which projects a pin 55 mounted on the toothed full-stroke segment 56 which is fast to the main rock-shaft 32.

The above described parts are shown in Fig. 4 in their normal positions with the pin 55 in the forward end of the slot 54 and the flange 51 in front of the pawl 47. When the machine is operated the full-stroke segment 56 rocks rearward with the shaft 32 as hereinafter described and thus carries the pin 55 out of the slot 54, which action releases the transfer operating slide 52 and allows the same to be drawn rearward as far as the length of slot 53 will permit. As the transfer operating slide 52 passes rearward the flange 51 pushes the pawl 47 aside until it has passed, when said pawl is drawn back to its normal position by its spring 49. As the shaft 32 is rocked back toward the normal position the pin 55 again enters slot 54 and forces the slide 52 back toward its normal position, which action causes the flange 51 to engage the cam face 48 of the pawl 47 and force the same with the slide 44 upward thus rocking all of the shafts 15 and disengaging all of the pawls 16 from their respective key shanks. The transfer operating slide further carries a series of anti-friction roller-studs 57 which are arranged as hereinafter described to engage and operate rigid arms 58 one of which is mounted upon each of the rock-shafts 29 except the topmost one.

In order to prevent the simultaneous operation of two or more of the special keys 3, I provide each of said keys with a wing 59; (Figs. 3 and 19) which are adapted to pass downward and transversely through a slotted tube 60 containing a series of small sliding cylinders 61 having conical meeting ends. When one of the special keys is depressed it passes down between two of these cylinders by engaging their conical ends and forcing them apart and thus in the usual manner locks all the remaining special keys as there is only enough free space in the tube 60 to allow the passage of one of the wings 59 between the cylinders. The entire keyboard is detachably secured in position so that it may be removed as a whole. The board may be attached in any suitable manner but I preferably secure the same by overlapping flanges as shown in the drawings.

In the present machine the registering mechanism is unlocked and its operation begun by the depression of an amount key and a special key. The result is accomplished by means of the following locking devices.

*Machine locking devices.*—Each of the amount keys is provided at its lower projecting end with a laterally projecting pin 62 which contacts with one of a series of arms 63 each of which is fast to one of the aforesaid rock-shafts 39 as shown in Fig. 2. There is one of these rock-shafts coöperating with each horizontal row of amount keys and each rock shaft is provided at its right hand end with a rigid arm 64 (Fig. 4). These arms are arranged to respectively engage pins 65 fast on the aforesaid slide bar 50 to raise said slide when any one of the amount keys is depressed. The said slide-bar 50 is mounted in position by being formed with elongated slots 66 through which two of the shafts 39 pass. The slide 50 is normally held in its lower position by the aforesaid coiled spring 49 which connects it, as shown in Fig. 4 with the pawl 47. Mounted rigidly upon the slide-bar 50 is a small block or projection 67, which when the slide is moved upward, either passes in front of a pivoted release pawl 68 or contacts with its lower end according to the position of said pawl. The release pawl 68 is pivotally mounted upon the upper front end of a bell-crank lever 69 which is in turn pivotally mounted upon a short shaft 119. The upper end of said lever 69 normally rests upon one of the shafts 29 and is held thereon by a coiled spring 71 which connects the pawl 68 with a portion of the main frame. The upward projecting portion of the release pawl 68 is arranged to be engaged by a pin 72 mounted on a crank-arm 73 which is fast on a rock-shaft 74. This shaft 74 carries a series of rigid arms 75 (Figs. 3 and 10) which are engaged by pins 76 mounted on the shanks of the respective special keys 3.

The drawer is released and the operation of the registering mechanism started, by swinging the bell-crank locking lever 69 upward, in a manner to be presently described. By reference to the mechanism just referred to it will be seen how it is that the operation of both a value key and a special key is necessary in order to move the bell-crank lever to effect the drawer release, and it makes no difference whether the amount key is operated before the special key or vice versa, or whether both the keys be operated simultaneously. If the amount key be pressed, the slide 50 is raised in the manner already described, thereby bringing the small block or projection 67 up and in front of the lower end of the release pawl 68. While the block then is in this raised position, or in other words, when an amount key is depressed, the release pawl cannot be swung backward on its pivot. When, therefore, any special or department key is subsequently pressed, the shaft 74 is rocked and the crank-arm 73 and the pin 72 carried thereby are swung downward and toward the rear, and contact immediately with the upper end of the release-pawl. The latter, however, cannot swing rearwardly, as already described, and the effect therefore, is to swing the bell-crank 69 upward, the pin 72 sliding down the front edge of the upper end of the release-pawl and the lower end of the release-pawl sliding upward behind the small projection 67. As before stated, the swinging upward of the locking lever releases the cash drawer and starts the registering mechanism. Suppose now a special key were operated first. The crank-arm 73 and pin 72 would be swung rearward, as already described, and as the block or projection 67 is entirely below the release pawl, the latter is free to swing on its pivot. Therefore, the bottom edge of the lower end of the release-pawl is brought squarely into the path of the small projection 67. The subsequent operation of a cash key raises the slide 50 and the projection 67. The latter immediately contacts with the release-pawl and raises it, at the same time swinging the locking lever upward and releasing the cash drawer. The bell-crank locking lever 69 is further formed upon its lower arms 69ª with a projecting arm 77 having an apertured flange 78. An L-shaped lever 79 is fast to one end of a rock-shaft 80 suitably mounted in the frame of the machine and is so located that its free end passes through the aperture in the flange 78; a suitable enlargement or hook 81 being formed on the short limb of the L-shaped lever to prevent its disengagement from the flange 78. (See Fig. 4.) A coiled spring 82 is mounted upon said short limb and presses against the flange 78 so that when the bell-crank lever 69 is swung upward, its motion will be transmitted to the L-shaped lever as soon as the spring has been sufficiently compressed. The left-hand end of the rock-shaft 80 opposite from that carrying the bell-crank 79 is provided with a rigid rearwardly and downwardly extending lever 83, to the rear end of which is pivoted a forwardly extending pawl 84. This pawl is normally held in the position shown in Figs. 10 and 18, by an angular arm 85 formed thereon and which extends up and over the top of the lever 83 to limit the descent of the pawl. The forward end of the pawl is curved to the right to bring it on the opposite side of the lever 83. The lever 83 and pawl 84 are arranged to coöperate with a pivoted latch-plate 86 mounted upon the back of the cash drawer 4 and normally drawn to the right by a coiled spring 87 (see Fig. 18) which connects said plate to the drawer. The latch-plate is further braced in position by a pin 88 so as to resist any strain brought to bear thereon by the normal tendency of the cash drawer to open. The upper end of said latch-plate is formed with the notched upper end 89 which is normally drawn into a position to contact with the rear end of the lever 83 to prevent the cash drawer from opening. When the shaft 80 is rocked in the manner before described the rear end of the lever is elevated sufficiently to clear the latch-plate and allow the cash drawer to open. When it is being closed, the bent front end of the pawl 84 enters the notch in the upper end of the latch-plate. As the closing movement continues, the right-hand edge of the upper end 89 of the latch-plate strikes the left-hand side of the pawl 84 and the latch-plate is thereby swung to the left against its spring 87 until it passes back of the rear end of the lever 83, whereupon it promptly snaps into position behind the rear end of said lever and so as to retain the drawer in its closed position. The lever 83 is extended forward from the shaft 80 so as to project above a lug 83ª formed on the slide 21 (Fig. 8). Now, when one of the amount keys has been operated and then one of the special keys is pressed or vice versa, the spring 82 will be compressed, as before described, to move the lever 79, but this movement will not take place until the second key is operated, whether it be amount or special key, has been fully depressed, as during the depression of the second key the slide 21 will move upward, thus causing the lug 83ª to contact with the forward end of the lever 83 and thus hold its rear end down in engagement with the drawer latch. When the second key operated, whether it be amount or special key, has been fully depressed, the slide 21 will of course, drop back to its normal position shown in Fig. 8 and will thus permit the lever 83 to operate under the stress of the spring 82 which has been meanwhile compressed. This construction prevents the release of the cash drawer until the operated special key has been depressed far enough to latch it in its operative position. The cash drawer 4 when released is forced out of its casing by a coil-spring 90 interposed between the back of the drawer and the drawer casing in a manner well known in the art and needing no further description here.

Having now described the key board, its coöperating detents and the means for releasing the cash drawer in connection with the keys, next in order of description are the counter operating devices which are limited in their movements by the keys which act as stops therefor and thus permit the operation of said devices to a greater or less degree according to the value of the key depressed.

*Counter operating devices.*—The counter operating devices comprise primarily a series of inclined rack bars 91, 91ª mounted in the main frame by means of transverse shafts 92 which pass through elongated slots 93 formed in said bars; the bars being suitably spaced by sleeves 94 mounted on said shafts between them. These bars are arranged in four groups or tiers of seven bars each so that each group will be capable of operating the three counters of each respective tier, the arrangement being best shown in Fig. 1. Counting from the right-hand side, the first five rack bars of each group are registering racks 91. The sixth and seventh rack bars of each group are the transfer racks 91ª. (See Fig. 8.) The right-hand rack bar of each group represents the units of cents bank of keys, the second bar from the right in each group represents the tens of cents, the third bar represents the units of dollars and so on throughout the first five bars of each group counting from the right. I thus have four bars (one in each group) which represent units of cents, four which represent tens of cents, and so on through the several denominations. With this structure it becomes necessary to couple the corresponding bars so that they are moved in unison. To accomplish this result each of the units of cents bars meshes with a segmental pinion mounted upon the uppermost one of a series of transverse rock shafts 29, for which see Fig. 14. Each segmental pinion 95 is movably connected to its shaft 29 by a radial pin 97 fast to said shaft and which projects through an elongated slot 98 formed in the hub or sleeve of the pinion. By this structure the pinion 95 may have a limited movement independent of the shaft 29 upon which it is mounted. This limited and independent movement is utilized in effecting the transfer, as will be presently described. Each of the pinions 95 is connected to its respective pin 97 by a coiled spring 99 which will normally draw the forward end of the pin against one side of the slot 98. As shown in Fig. 2 of the drawings, the pin 97 is resting against the opposite wall of the slot 98 from that against which it would normally rest because of the stress of the spring 99. While in this position it will be observed that the pinion 95 may move forward the distance of one tooth under the impulse of the spring 99 but it will be arrested by the pin 97. In order to rotate the registering shaft 29 and thus cause the forward end of the pin 97 to assume the position shown in Fig. 2, I provide the aforesaid arms 58 and the roller studs 59 which are carried by the transfer-operating slide 52, Fig. 4. These parts, after the rack-bars 91 have been returned to normal position, impart a slight additional rotary movement to the registering shafts 29 just at the end of the operation of the machine. This final movement of the shafts is of course independent of the pinions 95 thereon because the latter are in engagement with their respective registering racks, and at this time these are in normal position and prevented from further upward movement by their stop-levers 152. Therefore, the effect of this final rotary movement is simply to put all the springs 99 under tension and to move the pins 97 until they strike against the opposite sides of the slots 98 from those with which they were before in contact. With the springs 99 thus under tension, if one of the racks is at this time released by its stop lever, its coöperating spring 99 immediately turns the segmental pinions 95 forward and consequently raises the engaged rack-bar. The arrangement is such that the rack-bar can only be thus raised far enough to move the engaged registering wheels one notch. In this manner, as will be more fully described hereafter, the transfer is effected.

It will be seen from the foregoing that as the registering racks 91 mesh with the pinions 95, the descent of one of said bars will cause its pinion to be rocked and thus rock the shaft 29 and all the three other pinions mounted thereon, which of course will result in all the racks meshing with said pinions being correspondingly moved. As all of the shafts 29 and their immediately coöperating parts are similar in construction the above description will suffice for all. Each of said shafts 29 is further provided with a series of registering stop arms 100 arranged in graduated order to permit of a greater or less movement of said shaft, as best shown in Figs. 13 and 14. When one of the amount keys is depressed, the shaft 29 of its respective bank is released, and the simultaneous descent of the four rack-bars which mesh with the pinions on this shaft, causes the shaft to rotate until one of the arms 100 contacts with the shank of the depressed key. When one of the registering shafts 29 is released, as above described, a spring 96ª, one of which is located upon the left-hand end of each shaft, immediately turns the released registering shaft rearward, see Fig. 17. Near its left-hand end each registering shaft is provided with a rigid arm 101 and the spring 96ª of each registering shaft is connected at one end to the pin 102 on the arm 101 and at the other to some fixed portion of the frame of the machine. See Fig. 10. The spring 96ª by turning the registering shaft turns also the segmental pinions on the shaft, and assisted by gravity, and other springs, causes the racks in engagement with the pinions on that shaft, to drop as the shaft turns, until one of the graduated stop-arms 100, also on the registering shaft, contacts with the shank of the depressed key. The distance the racks descend is of course proportionate to the value to be registered and according to the numerical value of the amount key operated.

In the present embodiment of the invention, after the racks have dropped to their lowermost position, the counter is automatically thrown into engagement therewith. Upon the subsequent closing of the drawer or operation of the handle 6 the restoring frame 112, to be hereinafter described, engages all the displaced racks and raises them almost to normal position. Then the transfer-operating slide 52 turns the registering shafts 29 a short distance farther, which has the effect to turn the segment-pinions 95 to raise the racks to normal position; that is, a little beyond the point to which they were carried by the restoring frame. In this position they are supported by the transfer-operating slide 52. As soon as the cash drawer is released, both supports are withdrawn from the registering-rack-bars 91; that is the restoring frame and the transfer-operating slide both fall. If no amount key has been operated, all of the racks remain substantially in normal position, being held by the engagement of the hooked latching arms 103 over the ends of the arms 101. On the other hand, if an amount key has been pressed, its coöperating shaft 39 is thereby rocked, which throws the hooked latching arm 103 away from the arm 101 and thereby the coöperating registering shaft 29 is unlocked and the four racks which are in connection therewith, being unsupported, fall with the registering frame. Thus each registering rack 29 is locked against registering movement until a key in its coöperating bank is operated.

The latch arms 103 are not secured rigidly upon the shafts 39, but instead, as shown in Fig. 17, the hub of the latching arm is slotted and the pin passing through the shaft 39 projects into the opposite slots in the hub. In this manner the shaft 39 may be rocked a considerable distance without raising or unlatching the arm 103. It results from this construction that the registering shafts 29 are not unlocked until at the very end of the inward movement of the operated amount key. They are not released in fact until the amount key has been pressed in far enough for the detent pawls 16 to engage the key shank and thus lock the keys in their inner position. The present machine is constructed to operate only after one of the special keys has been operated and in order to preclude any possibility of the machine being otherwise manipulated each of the shafts 29 is provided with an additional locking device consisting of a slide-plate 107 which is formed with a series of hooks, 108 that project over the pins 102 when said plate is in its normal position shown in Fig. 8. This plate is suitably slotted to permit the passage of two of the shafts 39 therethrough to act as guides and supports therefor. The upper end of the slide is provided with a pin 109 which projects into a notch 110 formed in an arm 111 fast to the special key shaft 74 as shown in Figs. 8 and 10. The shaft 74, as before described, is operated or rocked upon a depression of any one of the special keys and when so rocked it elevates the arm 111 and thus moves the slide 107 upward to such an extent that the pins 102 are clear of the hooks 108 and the shafts 29 are thus free to rotate in the manner before described. The locking plate 107 is simply an auxiliary locking means and is provided, as before stated, to prevent fraudulent manipulation of the machine.

The registering rack-bars 91 (Fig. 2) are raised toward their upper normal position by the restoring frame 112, fast upon a transverse shaft 113 and which engages shoulders 114 formed on said rack-bars. The restoring frame is supported in position and operated by two cams 115 which are fast upon the shaft 32 near its opposite ends and engage anti-friction rollers 116 mounted upon the respective side bars of said frame as shown in Figs. 3 and 8. The connections for rocking the shaft 32 at each operation of the machine will be hereinafter described and for the present it will suffice to say that the shaft and cams 115 are rocked back and then forward at each of such operations to first drop the restoring frame and to then raise it to the position shown in Fig. 2. Said frame has a uniform stroke or travel at every operation. When the registering racks are unlocked and released, their descent is assisted by the coiled springs 117, each of which is connected at one end to a pivoted lever 118 mounted on the rigid transverse shaft 119. (See Fig. 3.) There are of course as many of the levers 118 as there are racks in each of the four sets. Or in other words, there are seven of these levers and each is formed at its forward end with a downwardly extending nose 120 which normally rests upon the restoring frame. In like manner, there are seven of the springs 117. There are also seven of the indicator-operating levers 122, which are pivoted at their front ends on the shaft 119, and carry each a roller 121. Each spring 117 is secured at its lower end to one of the levers 118 and at its upper end, for convenience, to a journaled pin on its respective roller 121. There are also pivoted upon the shaft 119, seven intermediate levers 123, see Fig. 23, which are employed to transmit the graduated movement from the registering racks to the indicator-operating levers 122. Upon the rear end of each intermediate lever rests one of the rollers 121 which are carried respectively by the indicator operating levers, Fig. 3. The front end, 124, of each intermediate lever is slotted as at 125 so as to straddle a pin 126, one of which is carried by each of seven of the registering racks. In front of its fulcrum each lever 118 is provided with a lip 127 which normally extends over and above the upper edge of the front end of its adjacent and coöperating intermediate lever. There is, however, enough space between the under edge of the lip and the upper edge of the intermediate lever so that the latter can have a slight independent movement when its registering rack is moved upward in effecting the transfer. In other words, when the rack is moved upward an extra tooth to effect the transfer, the said lever swins upward with it and the said space is just sufficient so that the intermediate level will not in so doing move the lever 118. When the restoring frame drops, if a key in the units-of-cents bank has been operated, the four units of cents registering racks also drop. If a key in the tens-of-cents bank has been operated then the four tens-of-cents registering racks drop, etc. When any of the racks drop, the front ends 124 of their coöperating intermediate levers 123 are of course swung downward. As soon as the restoring frame begins to move downward all of the levers 118 immediately drop down until their lips 127 strike their respective coöperating intermediate levers. If a certain rack has not been released, its coöperating lever 118 moves no farther. On the other hand, if the registering rack has been released, its coöperating lever 118 assists in its fall by pressing upon its coöperating intermediate lever. The upward movement of the restoring frame of course returns all the levers 118 to normal position.

As already stated, the rollers 121 of the indicator-actuating levers 122 are in the path of movement of the rear ends of the intermediate levers respectively. Each indicator-operating lever is pivoted at its rear end to one of the several indicator-operating racks 187, and the latter mesh directly with pinions on their respective indicators. A more specific description of these parts will follow, but sufficient has been said to show how the differential or graduated movement of the registering-racks is transmitted to the respective indicators to indicate any amount registered. When the restoring frame commences its return or ascending movement it first contacts with the noses 120 of the levers 118, and raises them a distance equal to one tooth of the registering racks before contacting with the shoulders 114 of said racks to raise the latter. Under this construction the tension of all the springs 117 is thrown off the intermediate levers when the parts reach their normal positions as shown in Fig. 2 and the racks are thus left perfectly free to be forced up an additional tooth to effect the transfer in a manner hereinafter described.

*The counters and transfer devices.*—Each of the counters comprises a frame 128 (Fig. 3) pivoted upon one of the three transverse shafts 129 and a series of counter-wheels 130 mounted loosely on a counter-shaft 131 journaled in the aforesaid frame 128, as there are twelve counters there are of course twelve counter-shafts. Each of the counter-wheels is provided with a pivoted spring-pressed pawl 132 (Fig. 3ª) which is adapted to engage a longitudinal groove 133 in the shaft 131 so that when said shaft (Fig. 16) is rotated by a thumb nut 134 fast to one end thereof the wheels will be picked up and returned to zero in a manner well known in the art. Each of the counter-wheels is further provided with a pinion 135 and a transfer cam disk 136 (shown in broken lines Fig. 3). The pinions are adapted to be thrown into mesh with their respective racks when the counter-frame 128 is rocked in the manner to be hereinafter described. The counter-wheels are held against any retrograde movement by spring-pressed retaining pawls 137 mounted in the frame 128 and engaging the respective pinions. As all of the counters are practically of the same construction and operation one only will be described as this description will suffice for all.

Each counter frame 128 is provided with a rearwardly extending counter arm 138 formed at its rear end with a slot 139 into which projects an angular offset 140 mounted on one of a series of twelve counter throwing bars 141, that is, one for each counter. Said bars are guided at their upper ends by a transverse rod 142 which passes through elongated slots 143 formed in said bars. The lower end of each counter-throwing bar is pivotally connected to one of a series of twelve counter-throwing levers 144 and is also provided with a triangular gravity pawl 145. Each counter-throwing lever 144 is formed at its forward end with the elongated slot 146 having a shoulder 147 which shoulder is adapted to be forced into a V-shaped groove 148 formed in the counter-throwing shaft 33. The shoulder 147 of each lever normally lies out of the groove 148, as shown in Fig. 3, but when one of the special keys is operated it slides under the forward enlarged end of its respective counter-throwing lever and raises it thereby forcing the shoulder 147 into the V-shaped groove 148. When the counter-throwing shaft 33 is now rocked by its counter-throwing spring 35 the counter-throwing lever 144 will be swung upward and thus force its counter-throwing bar 141 upward, which operation will result in the rocking of its respective counter frame to bring the pinions of the counter carried by this frame into mesh with their respective racks as shown by the middle counter in Figs. 3, 8 and 10.

It will be seen by reference to the drawings and previous description that while there are only five banks of amount keys there are seven rack bars in each group. Five of these rack bars, as has been previously explained, are controlled by the respective banks of keys, while the sixth and seventh bars in each group counting from the right are practically free of any control of the keys and are simply to effect the transfers between the fifth and sixth, and sixth and seventh counter wheels of each counter. It therefore becomes necessary to provide some means for moving the sixth and seventh bars of each group upward to effect the transfer when the latch which holds the bar in its normal position has been tripped in a manner to be hereinafter more fully described. This means comprises in each instance a coil-spring 149 (Fig. 10) which connects its respective transfer rack to the upper one of the guiding shafts 92. The slots 92ª through these transfer racks are only of a length to allow the racks to rise the space of one tooth and they prevent any descent of the racks below their normal position. By this means the sixth and seventh bars of each set are normally held in the position in which the regular operating racks are shown in Fig. 10, but at the same time are free to ascend the distance of one tooth in order to effect transfers.

Each of the racks 91 and 91ª is formed at its upper end with a shoulder 150 (see Fig. 3) which shoulder normally contacts with the noses 151 formed respectively on the series of stop levers 152 which are pivoted upon a transverse shaft 153. Each stop lever is formed at its lower end with a foot 154 which normally rests upon the upper end of a bell-crank trip lever 155, to hold said stop lever 152 in its normal position. The trip levers 155 are pivoted upon the upper one of two transverse shafts 156 which pass through slots 157 formed in the sliding transfer-plates 158. There are twenty-four transfer plates; that is to say, six to each of the four groups of counters. The lower end of each of the trip levers 155 is provided with a pin 159 which projects into a cam slot 160 formed in its respective transfer plate 158. Each transfer plate is further formed with a plurality of forwardly projecting transfer fingers 161 which, when the plate is in its normal position as shown in Fig. 3, project into the paths of the transfer cams 136. Each of the latter is mounted on a counter wheel of a denomination next lower than the denomination represented by the rack bar which the particular transfer plate controls. When one of the counter-wheels, say for example the units of cents, has made a complete revolution its cam will contact with one of the transfer fingers 161 and thereby force the plate 158 upward. This upward movement causes the walls of the cam slot 160 to swing the pin 159 forward and thus rocks the trip lever 155 to disengage its upper end from the foot 154. When this disengagement takes place the stop lever 152 swings forward at its lower end thus removing the nose 151 out of the path of the shoulder 150 of its respective registering or transfer rack. If the tripping or unlocking of the stop-lever 152 occurs when its respective registering rack is below normal position, the latter is returned to and beyond normal position far enough to effect the transfer on its engaged registering wheels, as will be readily understood. As before stated, the transfer movement is imparted to the rack by its transfer spring 99. If the tripping or releasing of the stop-lever 152 occurs while its coöperating registering rack is in normal position, the latter is immediately thrown up by its registering spring the space of one tooth, and the transfer is thereby accomplished. After any of the transfer slides 158 have been raised they are returned to its normal position by the resetting rock-shaft 162 suitably mounted in the main frame and formed with a V-shaped groove 163 into which a shoulder 164 of the slide is projected when said slide is elevated. After the transfer has been effected, the resetting shaft 162 is rocked which causes one of the walls of the V-groove to engage the shoulder 164 and force the transfer slide down. This downward movement of the slide causes the trip lever 155 to again assume its normal position and as the stop lever 152 has meanwhile been reset as hereinafter described, the same will again become locked with its nose 151 in the path of the shoulder 150. The resetting shaft 162 is rocked to return the transfer slides or plates by means of a rigid arm 165 fast thereon as shown in Fig. 3 and which projects between two spaced lugs 166 formed on a slide 167 which is suitably mounted on the main frame and is provided near its lower end with two similarly spaced lugs 168. An arm 169 fast to the shaft 32 is adapted, when the shaft is oscillated, to contact with the upper lug 168 and thus raise the slide 167; the lower lug 168 meanwhile passes under the arm 169 so that when the shaft 32 is rocked back again the arm will strike the lower lug and return the slide 167 to its normal position. The stop-levers 152 are all returned to their normal positions by a resetting yoke which comprises two pivoted arms 171 and a connecting cross bar 170. This cross bar as shown in Fig. 3 is normally free of the rear faces of the noses 151 so that when one of the stop-levers is released, it is free to pass forward at its lower end under the impulse of a coiled spring 172 which surrounds the shaft 153 and bears with its opposite ends one against the stop-lever and the other under the cross bar 170. The tension of the springs 172 normally tends to throw the stop-levers out of the positions shown in Fig. 3 whenever said levers are relieved of contact with the levers 155. One of the arms 171 of the resetting yoke is provided with a rearward extension 173 (see Fig. 6) which is pivotally connected to a link bar 174 which in turn is connected to an arm 175 rigid with the restoring frame 112. By this means the yoke 171 is thrown forward upon the downward stroke of the restoring frame 112 to reset any of the stop levers 152 which have been previously tripped. The operation also resets the registering and transfer racks.

The preceding description of the method and manner of throwing the counters into engagement with the registering and transfer racks according to the special key depressed applies to all of the special counters except the grand total counter, which is to receive all of the registrations except such as are registered upon the "charge" or "paid out" counters. The throwing lever 144ª (Fig. 4) of the grand counter is not arranged to be swung upward at its front ends by any special key, but is thrown into operative position through the medium of a rock-shaft 177 which carries a rigid arm 178 provided with a pin 179. This pin 179 projects into an elongated slot 180 formed in a projection 181 of the throwing lever 144ª of the grand total counter. The shaft 177 is provided with a series of arms 182 which extend above the respective levers 144 of the remaining special counters excepting the "charge" and "paid out" counters. Now, when one of the special counter-throwing levers 144 is raised by the operation of its special key, it also raises one of the arms 182 and thus rocks the shaft 177, with the result that the grand total counter will be thrown into operative position. The counter-throwing levers 144 are arranged to be retained in their operative positions by means of their respective pawls 145 which, when a lever is elevated at its rear end, passes above a cross-bar 183 of a rock frame 184 which is mounted on a transverse shaft 185. When a counter-throwing lever which has been elevated is to be released the frame 184 is rocked rearward at its lower end, thus permitting the pawl 145 to move downward free of said frame. When the counter-throwing levers are in their lower positions they are free to rise as the pawls are pivoted at their upper ends and would simply be forced back when striking the cross bar 183 of the frame 184. The upper cross bar 186 of the frame 184 is employed as a locking device for the indicator racks 187 as will be hereinafter more fully described. The upper and lower bars 186 and 183 of the rocking frame 184 are each provided (Fig. 9) with an apertured lug 188 through which passes the operating slide 189. The lower end of this slide as best shown in Figs. 2 and 9, is provided with two spaced fingers 190 and 191 and a hook-finger 192. The fingers 190 and 191 are normally held in contact with a cam 193 fast to the shaft 32 by a coil-spring 194 which connects the slide 189 to the lower bar 183 of the rock frame. The cam 193 is formed with a notch 194ª into which the finger 190 normally projects. Upon the initial movement of the machine the cam 193 swings rearward with the shaft 32 when the walls of notch 194ª engaging finger 190 swing the slide 189 rearward also, about shaft 185 as a center and thus rock the frame and disengage the bars 183 and 186 from the indicator racks and the counter throwing levers. When the cam has made a full rearward stroke the finger 190 passes free of the periphery of said cam upon which it has been riding and the slide 189 is thus drawn downward by the spring 194 so that the finger 190 will lie in front of the cam ready for the return stroke. When the cam moves forward the indicator supporting slide 189 is again rocked to bring the bars 183 and 186 into locking position by the contact of the cam with finger 190. The rearward movement of the lower end of the indicator supporting slide 189 is limited by the hook-arm 192 which is adapted to contact with the shaft 119 as best seen in Fig. 2.

*The amount and special indicators.*—The amount indicators are arranged as shown in Figs. 1, 7, and 11, in two groups facing respectively to the back and front of the machine so that identical indications can be made at both sides. The hundreds-of-dollars indicators 195 are fast to a transverse indicator-supporting shaft 196 which is suitably journaled on the main frame. One of these indicators as shown in Fig. 11 is provided with a pinion 197 through which the indicators receive movement in a manner to be hereinafter described. The tens-of-dollars indicators 198 are fast to a sleeve 199 which is journaled upon the indicator-supporting shaft 196. One of these indicators 198 is provided with a pinion 200 whereby motion may be imparted thereto. The units-of-dollars indicators 201 are loose upon the sleeve 199 and each is provided with an operating pinion 202. The tens-of-cents indicators 203 are also loose upon the sleeve 199 and each is provided with an operating pinion 204. The units-of-cents indicators 205 are fast upon a sleeve 206 and one of them is provided with an operating pinion 207, see Fig. 11. It will be seen from the above that for each pair of indicators 195, 198 and 205 only one operating rack-bar 187 will be required, while each of the duplicate independently movable indicators 201 and 203 will require a rack-bar of its own, thus making seven rack-bars in all, as clearly shown in Figs. 7 and 11. Each of the rack-bars 187 is provided at its upper end with a series of rack teeth 208 which mesh with the respective pinions on the indicators. The rack bars are guided at their upper ends and held into mesh with their respective pinions by a slotted plate 209 (Fig. 3) through which they pass and which is mounted rigidly upon the main frame. The lower end of each indicator-operating rack-bar 187 is slotted as at 210 to permit the passage of a guide rod 211 therethrough; said rack-bars being spaced upon said rod by sleeves 212 mounted on said rod between the same. The lower end of each indicator operating rack is provided with a laterally projecting pin 213 which projects through an elongated slot 214 one of which is formed in each of a series of seven indicator-operating levers 122 which are journaled upon the transverse shaft 119.

As before described, each of the intermediate levers 123 moves according to the value of the operated key in the bank of value keys with which said intermediate lever coöperates. When the front end of the intermediate lever is swung downward by its registering rack, the rear end raises and carries upward its indicator-operating lever 122 and its indicator-operating rack 187. The latter of course turns its rotary indicator a greater or less distance according to the movement of the registering rack. As soon as the indicator-operating rack has been moved upward and comes to rest, the upper bar 186 of the indicator-supporting frame is swung rearward and into engagement with a tooth of the rack 215 which is formed on the front edge of each indicator-operating rack near its lower end, and thereby the indicators are held in position to show the amount of the last recorded transaction until the subsequent operation of the machine. As soon as the cash drawer begins to open, the indicator-supporting frame is rocked on its shaft 185 and thereby the indicators are all released and immediately return toward normal position under the impulse of their springs 117. The same movement of the indicator-supporting frame swings the lower bar thereof back from under the counter-throwing levers 144 and then the counters previously in engagement with their registering-racks being released, are thrown out to normal position by the gravity of the parts connected to said counter.

As before described, three pairs of the indicators are operated by three racks: that is, one rack to each pair, but as the machine is shown in the drawings, each of the other four indicators must have a separate rack. In other words there must be two synchronously-moving indicator-operating racks for the units-of-dollars indicators, and likewise two other synchronously-moving indicator racks for the two tens-of-cents indicators. This is very readily accomplished, however, by connecting the two units-of-dollars indicator-operating racks with two units-of-dollars registering racks in different groups. For example, counting from the right, one of the units-of-dollars indicator-operating racks is connected to the units-of-dollars registering rack in the first group. The other units-of-dollars indicator-operating rack is connected to the registering rack of like denomination in the fourth group, but as both these registering racks are in engagement with segment pinions on the same registering shaft 29, it follows that two indicator-operating racks must always move simultaneously and to the same extent. In like manner, one of the tens-of-cents indicators is connected to the tens-of-cents registering rack in the second group, and the other to the tens-of-cents registering rack in the third group.

The special or department indicators are constructed in the form of shields or flashes and are arranged in duplicate sets, one half to the front and the other to the rear of the machine. These special indicators, as best shown in Figs. 1, 2, 7, and 21, are nested or placed one within the other and as best shown in Fig. 7 have the general form of yokes whereby they may readily straddle the regular amount or value indicators. The duplicate indicators for the back and front will move in unison as they are rigidly connected together as shown in Fig. 21. Where the duplicate special indicators are joined together at the middle, they are each provided with a pinion 217. These pinions mesh with three special-indicator-operating racks 218 which are supported on the shaft 211 and slotted plate 209, in a manner similar to the indicator-operating rack bars 187. Each special indicator operator rack-bar is formed upon its rear edge with a series of rack teeth 219 (Fig. 2), which mesh respectively with three independent movable segmental pinions 220. The middle one of these pinions is fast to a transverse rock shaft 221 which is mounted in the main frame while the other pinions are fast to sleeves 222 which are journaled on the said shaft 221. Each of the sleeves 222 carries four cam arms 223 while the shaft 221 is provided outside of the sleeves 222, with four similar cam arms 224 two at each end (see Fig. 15). All of the cams are arranged in graduated order and in the paths of anti-friction rollers 225 (Fig. 2) mounted on the respective counter-throwing bars 141. When a counter is thrown into operative position through its bar 141 the upward movement of the latter will cause its respective roller 225 to contact with and operate its cam arm 223 or 224 and thereby rock either the shaft 221 or one of the sleeves 222. This movement of the shaft or one of the sleeves will correspondingly move its segment 220 and thus cause the same to elevate the rack bar 218 to a corresponding degree and to turn the proper indicators to show through the usual sight apertures in the front and back of the cash register casing (not shown). The duplicate special indicators 216$^a$ (Fig. 21) are extended in front one at its lower edge and the rear one at its upper edge to form a special "sale not registered" sign which remains normally in view at the sight opening in the case, unless obscured by the other special indicators passing in front thereof, or when moved away by the adjustment of said indicator 216$^a$.

It will be seen from the foregoing description that the special indicators are set by the movements of the counter-throwing bars 141 and as the latter are held in their operated positions after the final movements of the machine have ceased, the special indicators will be held in their set positions until the succeeding operation of the machine, when the previously operated counter is thrown out and the counter operating bar 141 descends. When the special indicator-operating racks 218 are released they are drawn down to normal position by coiled springs 226 which connect said racks with the transverse shaft 211.

As has before been stated the main operating mechanism comprises primarily the oscillating restoring frame 112 which is provided with anti-friction rollers 116 which rest upon cams 115 mounted upon the main rock-shaft 32. The movements of the restoring frame are therefore dependent upon the oscillation of the shaft 32 and to secure this oscillation connecting mechanism between this shaft and the cash drawer and also between this shaft and the operating handle 6 are provided, whereby the machine may be operated by either one as may be most convenient.

*The common operating mechanism.*—The main operating lever 227 is pivotally mounted loosely on the main operating shaft 32 and is provided at its rear downwardly-projecting end with an anti-friction roller 228 which, as shown in Fig. 2, rests upon the upper edge of a metal bracket 229 which is rigidly secured to the rear of the cash drawer 4. Mounted fast upon the shaft 32 in proximity to the main operating lever 227 is a sleeve 230 provided with a projection 231 which is adapted to coöperate with the forward end of a pivoted spring-pressed pawl 232 pivoted upon the main operating lever 227 and provided at its rear end with an upwardly-turned nose 233. When the lever 227 is in its normal position shown in Fig. 2 the nose 233 is contacting with the under side of the shaft 113 and thus the forward end of the pawl 232 is held out of the path of the projection 231. When the drawer latch is tripped in the manner before described the drawer is forced out of the casing by the spring 90 (Fig. 3) and as it passes forward the lever 227 descends. As this operation is taking place the shaft 32 is also released and rocked rearward. This releasing of the shaft is accomplished by raising the locking end 69ª of the locking lever 69, which normally projects into the path of a lug 69ᵇ fast to the ratchet segment 56 as best shown in Fig. 4. When the lever 69 is raised in the manner before described the locking arm 69ª is raised therewith until it disengages from the projection 69ᵇ. When the shaft 32 is released in this manner it is rocked rearward by a coiled spring 234 (Fig. 20) which passes about the grooved periphery of a cam shaped plate 235 which is fast to the shaft 32 and it has its other end suitably secured to one of the cross shafts 142 of the machine (Fig. 7). The movement of the shaft 32 under the stress of the spring 234 is assisted by a coiled spring 236 (Figs. 2 and 9), which is mounted about a slotted link-plate 237 and bears with its opposite ends against two loose plates 238 mounted on said link-plate. The lower end of the plate 237 is connected to the cam 193. The shaft 119 passes through the upper slotted portion of the plate 237 and forms a bearing or stop for the upper plate or washer 238. As the shaft 32 starts its rearward movement the plate 237 is forced upward thus compressing the spring 236 against the shaft 119, but when the stress of the operating spring 234 is nearly spent, the pivot or fulcrum of the plate 237 passes the dead center of its movement and the tension of the spring 236 is exerted to continue the movement of the plate cam 193 and shaft 32. In order to prevent any sudden movement under the impulse of the above described operating spring, the shaft 113 is provided with a rearwardly projecting arm 240 which is pivotally connected to the lower end of a dash-pot 241 (Fig. 2) which is sealed and contains a piston and a supply of oil. The piston head is connected to a piston rod 242 which is pivoted at its upper end to a shaft 211. The piston head may be of any desired construction and as it forms no part of the present invention a further description is not deemed necessary. When the restoring frame 112 descends, during the rearward movement of the supporting cams, the arm 240 is moved upward thus elevating the cylinder 241 against the relatively stationary piston. The passage of the oil through or by this piston head retards the movement of the restoring frame 112 and registering racks and thus prevents any shock or jar to the operating parts of the machine. When the machine is to be operated to reset the parts by the closing of the cash drawer, the operations above described take place in the order enumerated, the shaft 32 being released and rocked rearward while the drawer is passing out of the casing. When the main operating lever 227 starts its descent, the nose 233 is moved out of contact with the shaft 113 and the forward end of the pawl 232 is forced by its spring into contact with the sleeve 230. Upon the final outward movement of the drawer the pawl 232 rides over the catches behind the projection 231 so that when the cash drawer is again returned and the lever 227 raised, the shaft 32 will be caused to turn with the lever and reset the parts to their normal positions.

In order to prevent fraudulent operation of the machine such as partly closing the cash drawer and then allowing the same to open again and operate lever 227 without fully returning the parts to their normal positions, a pivoted latch lever 243 is employed (Fig. 2). This is mounted upon the shaft 113 and is provided near its lower end with two notches 244 and 245. The upper end of said latch lever or rather the sleeve portion of it is provided with a lug 246 which projects laterally into the path of a radial pin 247 fast to the shaft 113. When the parts are in the positions shown in Fig. 2 a pin 248 mounted on the lever 227 rests in the upper notch 245 and thus holds the lever 227 in its elevated position. When the restoring frame 112 commences its downward movement the initial movement of the shaft 113 causes the pin 247 to contact with the lug 246 and thus rocks the lever 243 rearward and disengages the same from the pin 248. This action leaves the lever 227 free to descend in the manner before described. When the parts are being returned to normal position upon the closing of the cash drawer the pin 248 first engages the lower end of the lever 243 until it comes into alinement with the notch 244 when the lever passes under the pin and locks the said lever 227 from any retrograde movement. As the restoring frame cannot start its downward movement until it has fully completed its upward movement it will be seen that after the pin 248 has passed into the notch 244 the lever 227 must be fully elevated before the pin 247 can operate to release it from the lever 243. The above described operation takes place when the machine is to be operated or turned to normal position by the closing of the drawer but when the drawer is held closed or if it is desired to leave the drawer open during a rush of business and still operate the register the handle 6 is brought into play to return the parts to their normal positions. This handle is pivotally mounted upon a projecting end of the shaft 32 and is provided with a disk 249 which carries two diametrically arranged pins 250 as best shown in Figs. 6 and 12. These pins are adapted to normally contact with two diametrically arranged lugs 251 formed on the sleeve which is fast to the shaft 32. When the shaft 32 is released and rocks rearward, its upper lug 251 passes down until it engages the lower pin 250, while the lower lug 251 passes up on the opposite side until it engages the upper pin 250. If the handle 6 is now drawn forward the pins 250 will return the lugs 251 to their normal positions shown in Fig. 6 and thus rock the shaft 32 back to its normal position. The handle 6, however, is normally locked in the position shown in Fig. 6 by a pivoted bell-crank latch 252 which is journaled on the shaft 113 in such manner that one end of the same is normally drawn into the path of the lower pin 250 by a coiled spring 253 which connects said lever 252 to the main frame. The upper end of this lever 252 is formed with a laterally-projecting lug 254 which extends over the top of the arm 175. When the restoring frame 112 descends, the arm 175 strikes the lug 254 and rocks the lever 252 against the tension of its spring to disengage its lower end from the pin 250 and allow the handle 6 to be operated. The upper lug 251, better shown in Fig. 12, is provided with an extension 255 that is engaged by the hook end 256 of a latch 257 pivoted on the shaft 113. This latch is normally held up out of operative position by the upper pin 250 which contacts therewith. When the handle 6 is moved forward, however, to turn the shaft 32, the upper pin 250 moves from under the latch 257 and allows it to drop so that when the extension 255 again reaches its normal position it enters the hook end of the latch 257 and is locked into position until the handle is again returned to normal position, when the pin 250 again raises the latch. This construction is desirable to prevent any fraudulent operation of the machine such as releasing the several parts when the handle is in its depressed position. The disk 249 is connected to a coiled spring 258, which in turn is connected to the main frame so that when the handle is depressed a spring tension will be established for returning said handle to its normal position.

In order to prevent any partial operation of the handle 6 the periphery of the disk 249 is toothed and is adapted to be engaged by a pawl 259 pivoted upon the main frame and normally drawn into the position shown in Fig. 6 by a coiled spring 260 which connects it to said main frame. The disk 249 is further provided with notches 261 whereby the pawl may reverse its action at the end of the respective strokes in a manner well known in the art. In order to compel a full stroke of the shaft 32 a spring-drawn full-stroke pawl 262 (Fig. 4) is mounted on the shaft 119 and is adapted to engage the toothed periphery of the segment 56 to compel a full stroke of the segment in both directions in substantially the same manner as described in connection with the full-stroke mechanism of the operating handle.

In order to sound an alarm upon each operation of the machine a bell 263 is mounted upon the main frame with a bell hammer lever 264 for sounding it (Figs. 7 and 22). This hammer is of a bell-crank formation and is pivotally mounted on the shaft 113. The hammer is normally held in its retracted position by a pivoted detent-lever 265, which is formed with a shoulder 266 for engagement with the forwardly-projecting portion of said lever 264. The lever 265 is pivotally mounted on the shaft 119 and projects downward through a slot 267 formed in the lever 264, whereby said detent lever is guided in its operations in connection with the bell hammer lever. The detent lever 265 carries a pivoted pawl 268 of practically a bell-crank formation and which is limited in its movements by a lug 269 formed on the lever 265. The forwardly-projecting portion of the bell-hammer lever 264 is connected to an ear 270 formed on the detent lever 265, by a coiled spring 271. The shaft 32 is provided with a projecting pin 272 which normally lies above one arm of the pawl 268. When the shaft 32 is rocked backward the pin 272 engages the pawl 268 and as the pawl is bearing against the lug 269 it cannot rock upon its fulcrum and the consequence is that the detent lever 265 is forced rearward against the tension of the spring 271 and the shoulder 266 is disengaged from the bell hammer lever 264. This operation permits the bell hammer lever to spring forward under the stress of the spring 271 and sound the alarm. As the shaft 32 continues its rocking movement the pin 272 engages the forward end of the bell hammer lever 264 and depresses it to its normal position, thus allowing the detent lever 265 to again pass over the same so that the shoulder 266 will lock the bell hammer lever in its normal position. As the shaft 32 rocks backward the pin 272 simply rocks the pawl 268 upon its fulcrum until said pin again passes above the pawl when the latter returns to its normal position, because of the preponderance of weight forward of its fulcrum.

In the previous description it has been presupposed in each instance that a transaction has been made which included an amount either received in cash, received on account, charged or paid out, but it is sometimes also desirable to open the cash drawer for change and other purposes and to effect this opening of the drawer without a depression of any of the amount keys a "no sale" key 273 is added as shown in Fig. 5. This key of course controls no counter but does control one of the special indicators in the same manner that each of the special keys controls its special indicator. When this special key is forced inward the pin carried by its shank engages the upper cam end of a lever 274 (Fig. 23) which is pivoted upon the shaft 119, as shown in dotted lines in Fig. 4, and extends up beside the lever 69 and the pawl 68. This lever is provided with a laterally-projecting lug 275 which projects under the lever 69. It will thus be seen that the raising of the lever 274 upon the depression of the "no sale" key will also raise the lever 69 and thus release the machine substantially in the manner before described. In constructing the machine it is preferable to have the special indicator "sale not registered" of a different color from the other indicators, red for instance, so that it will be conspicuous enough to attract unusual attention. If desired a heavy red line may be drawn across each of the counter wheels at the zero point so that the operator will know when he has turned the counter completely to zero by the appearance of a practically unbroken red line through the opening in the counter guard.

It may be noted that normally, that is, after a cash transaction has been recorded, two of the counters remain in engagement with the registering-racks. One is the grant-total counter and the other the department counter in which was registered the amount of the last recorded transaction. Suppose a sale has been made of dry goods. The operator presses the value keys representing the amount of the sale and then the "dry goods" department key, where-upon the parts are released and the grand-total counter and the department counter last registered in, are thrown out to normal disengaged position by the descent of the bars 141. Then just before the drawer reaches its outward position, and after the racks have all dropped, the grand-total counter and the "dry goods" counter are swung into operative engagement with said racks. And they remain in such engagement until the beginning of the succeeding operation of the machine. When the restoring frame is resetting the registering racks, the registering wheels of the engaged counter are turned, as will be readily understood, so as to register an amount corresponding to the value keys pressed. The object in having the last-operated counters remain in engagement with the registering-racks is simply to prevent the danger of over-registration or "overthrow."

Under the construction of the machine as described, the registering-wheels are in positive engagement with the registering-racks until and after said racks come to rest after completing the registering movement, and, therefore, the registering wheels can move only so far as the registering-racks take them. On the other hand, if the arrangement were such that the counters were thrown out of engagement as soon as the registering racks reached their upper or normal position, it might be possible to overthrow the registering wheels by giving them such momentum that they would move independently of the racks after they had been thrown out of engagement therewith. When the machine is operated by pressing the "charge" key or "paid out" key, the counters last in engagement are thrown out, and only the "charge" counter or the "paid out" counter, as the case may be, is thrown in. The grand total counter is not operated in connection with either of these counters. The machine may be operated to make change or to unload the money from the cash drawer, by simply pressing the "no sale" key, in which event the previously operated counters are thrown out of engagement and none are thrown in until the subsequent operation of the machine in connection with the amount or value keys.

The particular embodiment of this invention shown in the drawings shows a machine having twelve counters, but it will be readily understood that the machine may be provided with any number of counters from one up, and to make a single counter machine it is only necessary to omit eleven of the counters, the special indicators and many of the duplicate parts of the machine. And the cash register as a whole is susceptible of an almost infinite variety of changes and modifications to suit the particular business or the person for whom it is intended.

Certain of the features shown and described herein are also shown and described in my prior pending application, Serial No. 275, filed Jan. 3, 1900, and the features common to these two applications are broadly claimed in said prior application.

Having now described my invention, what I claim as new and desire to secure by Letters Patent is:—

1. In a cash register the combination with a register operating mechanism, of a series of independent counters and connections, spring means for bringing the counters and the operating mechanism together, a series of keys for setting any particular counter connection for operation by the spring means, and means independent of the keys for putting the spring means under tension.

2. In a cash register the combination with a register operating mechanism, of a series of independent counters and connections, a totalizing counter, spring means for bringing the counters and connections and the operating mechanism together, a series of keys arranged when operated to set the independent counter connections and totalizing counter connections for operation by the spring means, and devices independent of the keys for putting the spring devices under tension.

3. In a cash register the combination with a register operating mechanism, of a series of independent counters and connections, a spring operating means for bringing the counters and the operating mechanism together, a series of keys for setting the counter connections for operation in connection with the spring means, a member common to and released by all the keys and adapted to release the spring means, and devices independent of the keys for returning the common member to put the spring means under tension.

4. In a cash register the combination with a register operating mechanism, of a series of independent counters, a totalizing counter, spring devices for moving the respective counters into coöperative relation with the operating mechanism and means for controlling the throwing devices whereby the totalizing counter will be thrown into operative position only with certain of the special counters.

5. In a cash register the combination with a register operating mechanism, of a series of independent counters and connections, a totalizing counter, spring devices for throwing the respective counters into coöperative relation with the operating mechanism, a series of keys arranged when operated to set the counter connections for operation in connection with the spring throwing devices, a movable member for putting the spring devices under tension, and a cash drawer and an operating handle arranged to operate the movable member.

6. In a cash register the combination with a register operating mechanism, of a series of independent counters, spring devices for throwing the respective counters into coöperative relation with the operating mechanism, a movable member for putting the spring devices under tension, and a cash drawer and an operating handle for moving said member.

7. In a cash register the combination with a register operating mechanism, of a series of independent counters and connections, spring devices for throwing the respective counters into coöperative relation with the operating mechanism, a series of keys for setting the counter connections for operation in connection with the spring devices, a movable member for putting the spring devices under tension, and a cash drawer and operating handle for operating said movable member.

8. In a cash register the combination with a register operating mechanism, of a series of keys, a cash drawer, a latch for the said drawer, spring means for tripping the latch arranged to be put under tension by the keys, and means for preventing the operation of the latch before the final movement of the key.

9. In a cash register the combination with a register operating mechanism, of a series of independent counters, a totalizing counter, spring devices for throwing the respective counters into coöperative relation with the operating mechanism, a series of keys, a series of counter throwing levers arranged to be moved by the keys into connection with the spring throwing devices, and means operated by the throwing levers of the independent counters for operating the throwing lever of the totalizing counter.

10. In a cash register the combination with a register operating mechanism, of a series of independent counters, a rock shaft having a V-groove therein, a series of levers loosely mounted on said shaft and having projections arranged to be moved into said groove, a series of keys for adjusting said levers to force their projections into said groove, and means connecting the respective levers to the independent counters for bringing the same into coöperative relation with the operating mechanism.

11. In a cash register the combination with a register operating mechanism, of a series of independent counters mounted in movable frames, a totalizing counter also mounted in a movable frame, spring means for throwing the counters into position for operation, keys for connecting the desired counter with said spring means, and devices independent of the keys for putting the spring means under tension.

12. In a cash register the combination with a series of keys, of rack bars, a counter arranged to mesh with said bars, segmental pinions also meshing with said bars, controlling devices for limiting the movements of the segments according to the key operated, spring means between said controlling devices and segments, and stops for said rack bars arranged to be tripped by the counter wheels to allow an additional transferring movement of the bars.

13. In a cash register the combination with a series of keys, of a series of rack bars, a counter arranged to engage said rack bars, a series of segmental pinions engaging the rack bars, shafts carrying said pinions, springs between said shafts and pinions, a series of graduated arms on said shafts arranged to contact with the keys, and stop devices for the rack bars adapted to be tripped by the counter wheels.

14. In a cash register the combination with a series of amount keys, of a counter, a series of rack bars for operating said counter, segmental pinions gearing with the rack bars, a series of graduated registering stops arranged to contact with the amount keys, and flexible devices between said stops and said segmental pinions.

15. In a cash register the combination with a series of keys, of a counter mounted in a movable frame and arranged to be moved into and out of engagement with the racks, a series of rack bars operating the same, a restoring frame common to all of said rack bars and arranged to hold them in normal position, means coöperating with the keys for limiting the downward movements of said rack bars, spring devices mounted independent of the restoring frame for giving the rack bars an additional movement, and movable stops controlled by the counter for allowing this additional movement of the rack bars.

16. In a cash register the combination with a counter, a series of counter operating racks, a common operating frame for said racks, a cash drawer, a movable device engaging the cash drawer and normally out of connection with the common operating means but adapted to be automatically coupled thereto upon the opening of the cash drawer.

17. In a cash register the combination with an operating mechanism, of a counter, a cash drawer, devices arranged to be operated by the cash drawer, and means for connecting said devices to the operating mechanism only after the cash drawer has been opened whereby said operating mechanism is normally out of connection with the cash drawer when the latter is closed.

18. In a cash register the combination with an operating mechanism, of a counter, a cash drawer, devices arranged to be operated by the cash drawer, means connecting said devices with the operating mechanism only after the cash drawer has been opened so that the closing of the cash drawer will operate said mechanism, and a handle adapted to independently actuate the operating mechanism.

19. In a cash register the combination with a series of operating racks, of a counter adapted to engage the same, a movable restoring member common to all of said racks, a cash drawer, means for imparting movement to the common member upon the closing of the cash drawer but free of said member when the drawer is closed whereby said member may operate independently of the opening movement of the drawer.

20. In a cash register the combination with an operating mechanism, of a counter, a cash drawer, means operating by the closing of the cash drawer to actuate the operating mechanism but being adapted to become disconnected therefrom when the drawer is closed so that the operating mechanism can move independently of the opening of the drawer.

21. In a cash register the combination with an operating mechanism, of a counter, a cash drawer, means operated by the closing of the cash drawer to actuate the operating mechanism but being adapted to become disconnected therefrom when the drawer is closed so that the operating mechanism can move independently of the opening of the drawer, and an operating handle for actuating the operating mechanism when desired.

22. In a cash register the combination with a counter, of a series of counter operating racks, a restoring frame common to all of said racks, cams for supporting said frame, a shaft carrying said cams, a cash drawer normally disconnected from said shaft, and means for connecting the cash drawer with the shaft after the drawer has been completely opened.

23. In a cash register the combination with a series of operating racks, of a counter, a restoring frame common to said racks, means for operating said frame, a latch for said means, a series of normally operable amount keys, a series of normally operable special keys, means requiring the operation of a special key as well as an amount key in any order or sequence for tripping said latch, a special "no sale" key, and an independently operating lever coöperating with said key and adapted to trip the latch independently of the operation of the amount and special keys.

24. In a cash register the combination with a series of operating racks, of a series of counters mounted in movable frames, a series of pivoted levers for throwing said counters, pawls mounted on said levers, and locking devices adapted to be engaged by said pawls to prevent movement of said levers in one direction but not in the opposite direction.

25. In a cash register the combination with a plurality of operating racks, of a series of counters mounted in movable frames, a series of counter throwing levers mounted on a rock shaft, means connecting the levers to said shaft at will, spring devices for operating said shaft, and means independent of the keys for putting said spring devices under tension.

26. In a cash register, the combination with a plurality of operating racks, of a plurality of counters adapted to be thrown into connection therewith, a rock shaft, counter throwing levers mounted on said shaft, means for connecting the desired levers to said shaft, spring actuating means for said shaft, a latch restraining movement of the shaft, and means movable independently of the lever adjusting means for tripping said latch to permit the shaft to operate the counter throwing levers.

27. In a cash register the combination with a plurality of operating racks, of a counter, pivoted spring drawn levers for operating the racks when they are released, a common member for returning the racks and throwing off the spring drawn levers to relieve said racks of their tension, and transfer devices for moving said racks an additional tooth.

28. In a cash register the combination with a series of operating racks, of a counter, a rock frame adapted to return all of said racks, a series of spring drawn levers for drawing down the racks when they are relieved of the support of the rocking frame, means for throwing the tension of the rack operating levers off of the racks when the rock frame is in its extreme upper position, and transfer devices for moving said rack bars an additional tooth when they are relieved of the pressure of their operating lever.

29. In a cash register the combination with a counter, of a series of counter operating racks, means for actuating said racks, a series of indicator operating devices, means for operatively connecting the said racks and the indicator operating devices during one movement of said rack and for disconnecting them during the return movement of said rack, spring means for throwing the counter into mesh with the racks, and devices independent of the keys for putting said spring devices under tension.

30. In a cash register the combination with a series of keys, of a plurality of independent counters, a series of rack bars for operating said counters, a pivoted frame for operating said rack bars, a series of indicators, a series of pivoted levers connecting the rack bars and the indicators, a series of special keys, spring actuating means for throwing the counters into mesh with the racks, and devices independent of the keys for putting said spring means under tension.

31. In a cash register the combination with an operating mechanism, of a counter, spring means for throwing the counter into coöperative relation with the operating mechanism, a common operating member arranged to put the spring means under tension when moved in one direction and to release said spring means when moved in an opposite direction.

32. In a cash register the combination with a series of keys, of a series of rack bars, a series of independent counters, spring actuating means for throwing the counters into connection with the rack bars, a common operating member adapted when moved in one direction to put the spring means under tension, and a latch for rereleasing said spring means adapted to be operated upon the final movement of the common operating member in an opposite direction.

33. In a cash register the combination with a series of keys, of a series of rack bars controlled by said keys, a series of independent counters adapted to engage said rack bars, stop devices for said rack bars, trips for said stops, a sliding plate for each rack bar adapted to be operated by its respective counter wheels, and means connecting the trip devices with their respective sliding plates.

34. In a cash register the combination with a series of keys, of a series of rack bars controlled by the same, a series of counters mounted in movable frames arranged to be brought into connection with the rack bars, pivoted levers for throwing said counter frames, link bars connecting said levers and counter frames, an operating shaft, and devices for connecting said levers to the operating shaft at will whereby they are actuated to throw the counters.

35. In a cash register the combination with an operating mechanism, of a series of counters arranged to be brought into coöperative relation therewith, spring means for throwing the counters into such coöperative relation, devices for connecting the spring means to the independent counters, and means independent of said connecting devices for subsequently releasing the spring means to allow it to throw in the counters which have been previously connected.

36. In a cash register the combination with a series of rack bars, a counter, a common operating frame for said rack bars, a rock shaft carrying cams for operating said frame, a disk mounted fast on said shaft, and a coil spring connected to said disk passing partly about the same and also connected to a stationary portion of the machine.

37. In a cash register, the combination with an operating mechanism, of a cash safe having a movable part, means connecting said part to the operating mechanism whereby it may operate the latter or remain stationary while said mechanism is being otherwise operated, an operating handle, and means connecting said handle to the operating mechanism whereby it may operate the latter or remain stationary while said mechanism is being otherwise operated.

38. In a cash register the combination with an operating mechanism, of a plurality of independent counters arranged to be brought into coöperative relation therewith, throwing devices for said counters, a rock shaft to which the throwing devices become connected, an oscillating member connected to the movable parts of the machine, a latch for said rock shaft adapted to be tripped by said oscillating member when moving in one direction, spring operating devices for said shaft adapted to be put under tension when the oscillating member is moving in the opposite direction.

39. In a cash register the combination with an operating mechanism, of a plurality of counters arranged to be brought into coöperative relation therewith, a series of indicators, indicator operating devices, means for throwing in the desired counter, and a rock frame adapted to simultaneously lock the indicator setting means and the counter throwing devices while still permitting the operation of the machine.

40. In a cash register, the combination with an operating mechanism, of a plurality of independent counters, levers for bringing the said counters into coöperative relation with the operating mechanism, a series of indicators, a series of indicator operating devices, and a rock frame arranged to simultaneously lock the indicator operating devices and the counter throwing levers while still permitting the operation of the machine.

41. In a cash register the combination with an operating mechanism, of a plurality of independent counters, throwing devices for said counters, a series of indicators, operating devices for said indicators, a movable locking member for simultaneously locking the indicator operating devices and the counter throwing devices, a cash drawer, means operated by said drawer for actuating the movable locking member.

42. In a cash register the combination with an operating mechanism, of a series of independent counters, a series of indicators, means for throwing the counters, a rock frame for simultaneously locking the counter throwing means and the indicators, a spring drawn slide mounted on the rock frame, and a notched disk connected to the movable parts of the machine for operating said slide.

43. In a cash register the combination with an operating mechanism, of a plurality of independent counters, a series of counter throwing levers, a series of link bars connecting said levers to the counters, pivoted pawls mounted on said link bars, and a locking frame arranged to engage said pawls to hold them in their upper positions but allowing free movement of said pawls and links when in their lower positions.

44. In a cash register the combination with a series of amount keys, of a series of special keys, an operating mechanism, a latch for said mechanism, latch operating devices requiring the operation of both an amount and a special key, the construction permitting their operation in any order or sequence, an independent special key, a lever operated by the same, and a projection on said lever arranged to operate the latch.

45. In a cash register the combination with a counter, of a series of slidable rack bars, a series of amount keys, a series of controlling devices interposed between the amount keys and the rack bars, spring devices included in the connection between the keys and rack bars, and means connected to the movable parts of the machine for putting said spring devices under tension whereby the rack bars may be moved to effect a transfer independent of the controlling influence of the keys.

46. In a cash register the combination with a counter, of a plurality of rack bars, a plurality of keys, intermediate controlling mechanism between the keys and rack bars, springs included in said intermediate means, and means connected to the movable parts of the machine for putting said spring devices under tension during the final movement of each operation of the machine whereby the rack bars may make an additional transferring movement independent of the controlling influence of the keys.

47. In a cash register the combination with a counter, of a series of rack bars, a series of keys, means intermediate of the keys and rack bars for controlling the movements of the latter, and including spring devices, a series of rock shafts for putting said spring devices under tension, operating arms carried by said shafts and a reciprocal slide connected to the movable parts of the machine and having projections arranged to engage said arms to operate the shafts.

48. In a cash register, the combination with a series of keys, of a series of independent counters, a series of rack bars for operating said counters, a movable frame common to said bars, a series of spring devices mounted independently of the frame and the rack bars but put under tension by each operation of said frame, transfer devices operated by the counters and arranged to release the bars whereby they will be moved an additional tooth by said spring devices.

49. In a cash register the combination with a series of keys, of a counter, a series of rack bars for operating said counter, a movable frame common to said bars, spring means mounted independently of the frame and the rack bars and adapted to move said bars, means operated by the frame for putting the spring means under tension, at each operation thereof and transfer devices operated by the counter and arranged to release the bars so that they may be moved by the spring devices to effect the transfer.

50. In a cash register the combination with a series of keys, of a counter, a series of rack bars for operating said counter, a frame common to all of said bars for operating the same, spring devices mounted independently of the bars and the frame, for moving the bars independently of the movement imparted directly to them by the frame, and means for operating said frame to put the springs under tension at each operation of the machine.

51. In a cash register, the combination with a series of keys, of a counter, a series of rack bars for operating said counter, a frame common to all of said bars for operating the same, stops for said bars, transfer devices for releasing said stops, and spring means mounted independently of the frame and the bars but adapted to be put under tension at each operation of the machine by the movements of the same for moving the racks an additional tooth when they are released.

52. In a cash register the combination with an operating mechanism adapted to automatically operate when released, a series of keys for releasing said mechanism, a handle for positively returning the mechanism to its normal position, and means for locking the mechanism until said handle has again resumed its normal position.

53. In a cash register the combination with an operating mechanism adapted to automatically operate when released, of a series of keys for releasing said mechanism, an operating handle for positively returning the mechanism to normal position after the same has been released, a latch for securing the operating mechanism against operation when it is returned to normal position by said handle, and means connected to the handle for throwing the latch out of operative position when said handle again resumes its normal position.

54. In a cash register the combination with an operating mechanism adapted to automatically operate when released, of a series of keys for releasing said mechanism, an operating handle for positively returning the mechanism to its normal position, and a latch for said handle adapted to be operated by the final automatic operation of the operating mechanism.

55. In a cash register the combination with an operating mechanism, of a cash drawer, a pivoted lever adapted to be operated by the cash drawer to return the operating mechanism to its normal position, latching means for preventing a retrograde movement of said operating lever after it has been partially operated and before it has been returned to its normal position, and means connected to the operating mechanism for tripping said latching means.

56. In a cash register the combination with an automatic register operating mechanism, a series of keys for releasing said mechanism, a cash drawer and operating handle for returning said operating mechanism, the structure being such that the drawer may remain stationary when the handle is being employed or the handle may remain stationary when the drawer is being employed in its returning capacity.

57. In a cash register the combination with an operating mechanism including an oscillating frame, of a shaft carrying cams for lowering and raising said frame, a cash drawer, a lever adapted to be operated by said cash drawer, and a latch mounted on said lever and adapted to connect it to the aforesaid shaft only after the cash drawer has been opened.

58. In a cash register the combination with an operating mechanism including an oscillating frame, of a shaft carrying devices for raising and lowering said frame, a cash drawer, a lever adapted to be operated by said drawer, a movable device mounted on said lever for coupling it to the shaft only if the cash drawer is open, and an operating handle for actuating the shaft when the cash drawer remains closed.

59. In a cash register the combination with an operating mechanism, of a cash drawer, a movable latch plate mounted on said drawer, a movable latch connected to the operating mechanism so that it will be elevated to release the drawer and again allow it to resume its normal position whereby upon closing the drawer the latch plate will be forced to one side of the latch and finally become seated back of the drawer.

60. In a cash register the combination with the operating mechanism, of a cash drawer, a movable spring drawn latch plate mounted on said drawer, a movable latch connected to the operating mechanism and adapted to be raised to release the cash drawer and then return to its normal position whereby upon the closing of the drawer the spring drawn latch plate will be forced to one side by contact with the latch and will finally resume its normal position back of the latch to lock the cash drawer in position.

61. In a cash register, the combination with an automatic register operating mechanism, of a series of keys for controlling the movements of the same, a cash drawer, means intermediate the cash drawer and the operating mechanism for returning the latter to its normal position but allowing free independent movement of said mechanism, an operating handle, and means intermediate said handle and the operating mechanism for actuating the latter but allowing free independent movement of said mechanism.

62. In a cash register, the combination with a register operating mechanism including a series of independently movable elements, means for limiting the movements of said elements, a yoke frame common to all of said elements for actuating the same, a cash drawer, means intermediate the drawer and the yoke frame for actuating the latter but permitting free independent movement of the frame, an operating handle, and means intermediate said handle and yoke frame for operating the latter but permitting free independent movement of said frame.

63. In a cash register, the combination with a register operating mechanism, of a cash drawer, means intermediate said drawer and the operating mechanism for actuating the latter by the movement of the drawer, an operating handle, and means intermediate said handle and the operating mechanism for actuating the latter but allowing free independent movement of said mechanism.

64. In a cash register, the combination with a register operating mechanism, of a yoke frame for actuating the same, a cash drawer arranged to actuate said frame, an operating handle, and means intermediate said handle and frame for actuating the latter but permitting free independent movement of said frame.

65. In a cash register, the combination with an automatic register operating mechanism, of a series of keys for limiting the movements of said mechanism, a cash drawer for returning the mechanism to its normal position after it has been set, an operating handle arranged to return to its normal position after being operated, and means intermediate said handle and the operating mechanism for returning the latter to its normal position after it is set and independently of the cash drawer.

66. In a cash register the combination with a register operating mechanism, of a series of independent counters, spring means for bringing the counters and operating mechanism together, means for setting a particular counter for operation by the spring means and devices connected to the movable parts of the machine for gradually putting the spring means under tension and finally releasing the same.

67. In a cash register the combination with a register operating mechanism, of a series of independent counters mounted in movable frames, levers for operating said counters, a rock shaft and means for coupling the levers to the rock shaft at will.

68. In a cash register the combination with a register operating mechanism, of a series of independent counters mounted in movable frames, a rock shaft, and a series of independent throwing devices for said counters any one of which may be coupled to the shaft at will.

69. In a cash register, the combination with an operating mechanism, of a cash drawer, and means intermediate the drawer and operating mechanism for actuating the latter by the drawer, said means normally out of operative connection with the drawer; and means for establishing such operative connection by the movement of the drawer.

70. In a cash register, the combination with an operating mechanism, of a cash safe having a movable part, and means intermediate the movable part of the cash safe and the operating mechanism for operating the latter but normally out of operative connection therewith; and means for establishing such operative connection by the movement of said movable part of the cash safe.

71. In a cash register, the combination with an operating mechanism, of a cash drawer, means intermediate the drawer and the operating mechanism for actuating said mechanism and normally out of operative connection with said mechanism, and means independent of the cash drawer for actuating said operating mechanism.

72. In a cash register, the combination with an operating mechanism, of a cash drawer, operative means intermediate the cash drawer and operating mechanism but normally out of operative connection with said mechanism, and an operating handle also connected to the operating mechanism.

73. In a cash register, the combination with a counter and counter-operating racks therefor, of a common operating device for said racks, an operating member for said common operating device normally disconnected therefrom, and means for connecting said operating member to said common operating device after the latter has been displaced from normal position.

74. In a cash register, the combination with a counter and counter-operating racks therefor, of a common operating device for said racks, an operating member for said common operating device normally disconnected therefrom, and means controlled by said common operating device for connecting the operating member therewith for effecting the movement of the counter operating racks by the movement of the operating member.

75. In a cash register, the combination with a reciprocating main operating member, of a driven member partially operable independently of the main operating member; and means controlled by said operating member for coupling the same to the driven member when in a certain position.

76. In a cash register, the combination with a reciprocating main operating member, of a driven member having a constant excursion at each operation of the machine and partially operable independently of said main operating member; and means for coupling said main operating member to said driven member at the extremity of its initial movement of reciprocation whereby to actuate the driven member upon the final movement of reciprocation.

77. In a cash register, the combination with a reciprocating cash drawer, of a driven member partially operable independently of said cash drawer; and means for coupling said cash drawer to said driven member upon the completion of the full outward stroke of the cash drawer whereby to operate the driven member by the cash drawer upon the return movement thereof.

78. In a cash register the combination with a reciprocating cash drawer, of a register operating frame spring drawn in one direction independently of the cash drawer, an arm moved by said drawer, and a latch carried on said arm and constructed to couple the cash drawer to said frame at the completion of the outward stroke of the drawer whereby to restore the frame to normal position on the closing of the cash drawer.

79. In a cash register, the combination with a driven member of the machine, of a plurality of driving members for said driven member, each driving member having a one-way connection with the driven member whereby either driving member may operate the driven member while the other driving member remains in normal position.

80. In a cash register, the combination with a reciprocating main operating member, of a driven member adapted to be automatically operated in one direction independently of said operating member, and means for coupling said operating member to said driven member after said independent operation to move said driven member in the reverse direction.

81. In a cash register, the combination with an operating member, of a lever loosely carried thereby for operating the same, a pawl carried by said lever and adapted to engage said member to move it in one direction, and means for automatically disengaging said pawl from the operating member as the lever reaches the end of its stroke.

82. In a cash register, the combination with an oscillating main shaft of the machine, of a handle journaled on said shaft, connections between said handle and shaft such that the shaft may move independently of the handle but not the reverse, a driving member, and connections between said device and said shaft such that the shaft may move independently of the device but not the reverse.

83. In a cash register, the combination with a main operating device of the machine, of alternative actuating means therefor, and connections between each actuating means and the shaft for driving said shaft but allowing the remaining actuating means to continue inactive.

84. In a cash register, the combination with a series of differentially movable elements, of a main actuator for said elements, alternative operating means for said actuator having a one-way acting connection therewith for allowing an operation of the main actuator by any of the operating means without moving the remaining operating means.

85. In a cash register, the combination with an operating device, of an oscillating actuator for same, a reciprocating actuator for said operating device, and connections between each actuator of the operating device allowing movement of the operating device from either actuator while allowing the remaining actuator to continue in normal position.

86. In a cash register, the combination with an operating mechanism, of a series of independent registering devices, a shaft common to said devices, a series of levers loosely mounted on said shaft, a series of keys each of which serves to connect one of said levers to said shaft, and means connecting said levers and registering devices to bring said devices into operative relation with the operating mechanism.

87. In a cash register, the combination with an operating mechanism, of a series of independent registering devices including a total register, a shaft common to said devices, a series of levers loosely mounted on said shaft and connections from each of said levers to one of said registering devices including said total register, a series of keys each serving to connect one of the levers for a registering device and the lever for the total register to said shaft for operation thereby, and means for moving said shaft to bring said registering devices into operative relation with said operating mechanism.

88. In a cash register, the combination with a registering device, of an operating mechanism therefor, a cash drawer, and means actuated by said drawer normally disconnected from said operating mechanism but adapted to be automatically coupled thereto when said device is operated for actuating said operating mechanism.

89. In a cash register, the combination with a plurality of operating racks, of a counter operated thereby, pivoted spring-drawn levers for operating said racks when they are released, and a common member for returning said racks and throwing off the spring-drawn devices to relieve said racks of their tension.

In testimony whereof I affix my signature, in the presence of two witnesses.

JOHN H. McCORMICK.

Witnesses:
  WM. H. MUZZY,
  IRA BERKSTRESSER.

Copies of this patent may be obtained for five cents each, by addressing the "Commissioner of Patents, Washington, D. C."